(12) United States Patent
Suzuki

(10) Patent No.: US 8,174,643 B2
(45) Date of Patent: May 8, 2012

(54) LIGHT GUIDE PLATE, DISPLAY DEVICE, AND ELECTRONIC APPARATUS WITH DISPLAY

(75) Inventor: Hiromasa Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 490 days.

(21) Appl. No.: 12/421,243

(22) Filed: Apr. 9, 2009

(65) Prior Publication Data

US 2009/0256996 A1    Oct. 15, 2009

(30) Foreign Application Priority Data

Apr. 11, 2008  (JP) ................................. 2008-103688

(51) Int. Cl.
G02F 1/1335    (2006.01)
F21V 7/04      (2006.01)
(52) U.S. Cl. ............. 349/65; 349/62; 362/615; 362/616
(58) Field of Classification Search .................... 349/62, 349/65; 362/615, 616
See application file for complete search history.

(56) References Cited

U.S. PATENT DOCUMENTS

| | | | |
|---|---|---|---|
| 6,108,059 A * | 8/2000 | Yang ................................ | 349/65 |
| 6,731,355 B2 * | 5/2004 | Miyashita ....................... | 349/65 |
| 7,748,862 B2 * | 7/2010 | Kim ............................... | 362/97.2 |
| 2005/0190578 A1 * | 9/2005 | Miyashita ..................... | 362/615 |
| 2006/0269189 A1 * | 11/2006 | Seo ................................. | 385/39 |
| 2007/0139956 A1 * | 6/2007 | Sugimoto et al. ............. | 362/600 |
| 2008/0198621 A1 * | 8/2008 | Tanoue et al. ................. | 362/606 |
| 2011/0116010 A1 * | 5/2011 | Nagata et al. .................. | 349/62 |

FOREIGN PATENT DOCUMENTS

| | | |
|---|---|---|
| JP | 2000-249837 | 9/2000 |
| JP | 2003-140110 | 5/2003 |
| JP | 2005-122953 | 5/2005 |
| JP | 2006-108032 | 4/2006 |
| JP | 2006-351511 | 12/2006 |
| JP | 2007-299716 | 11/2007 |

OTHER PUBLICATIONS

Japanese Patent Office Action corresponding to Japanese Serial No. 2008-103688 dated Apr. 20, 2010.

* cited by examiner

*Primary Examiner* — Uyen Chau N Le
*Assistant Examiner* — Chris Chu
(74) *Attorney, Agent, or Firm* — SNR Denton US LLP

(57) ABSTRACT

Disclosed herein is a light guide plate including: a side end face on which light from a light source is incident; an incoming part which forms the side end face and by which the light coming in through the side end face is guided; a principal surface which is formed in a direction perpendicular to the side end face and through which the light guided by the incoming part is let go out; and a main body part which forms the principal surface and which is continuous with the incoming part on the opposite side from the side end face.

10 Claims, 15 Drawing Sheets

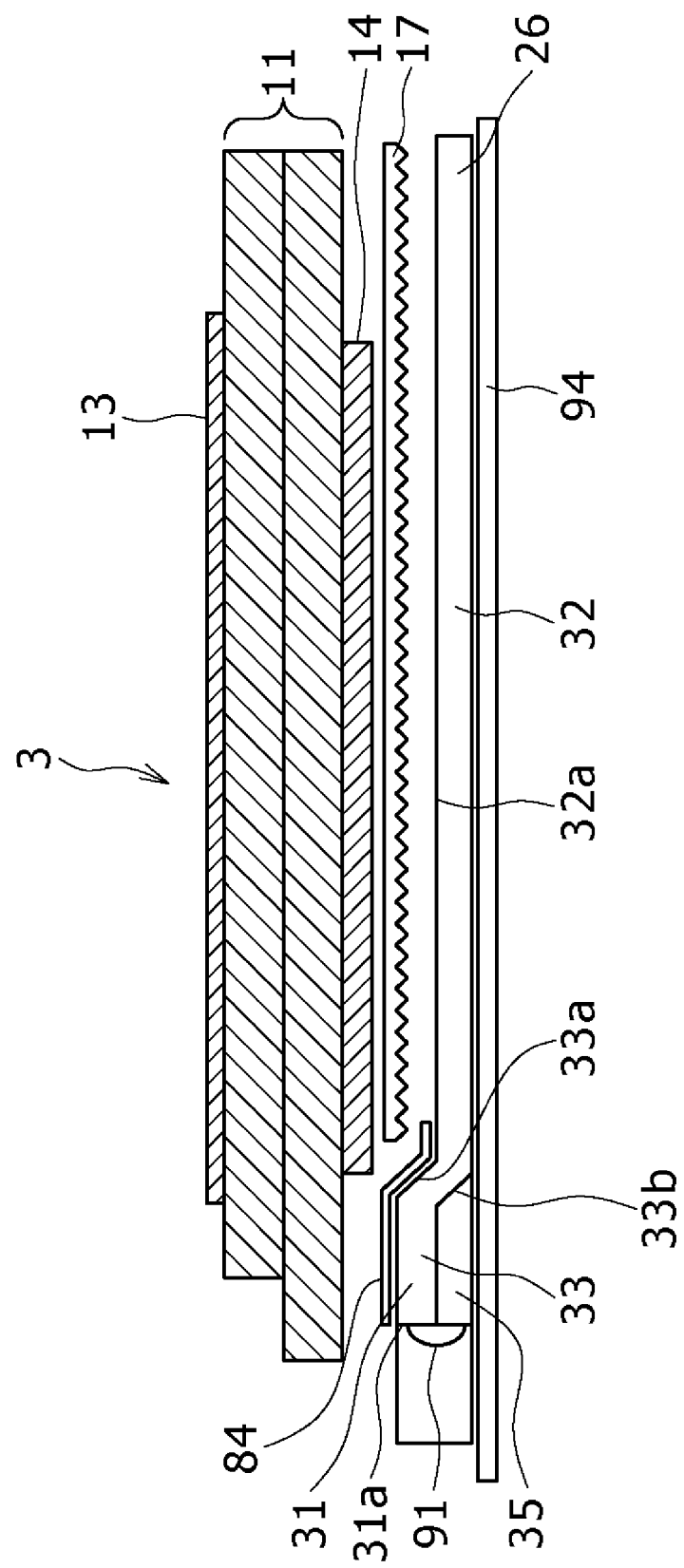

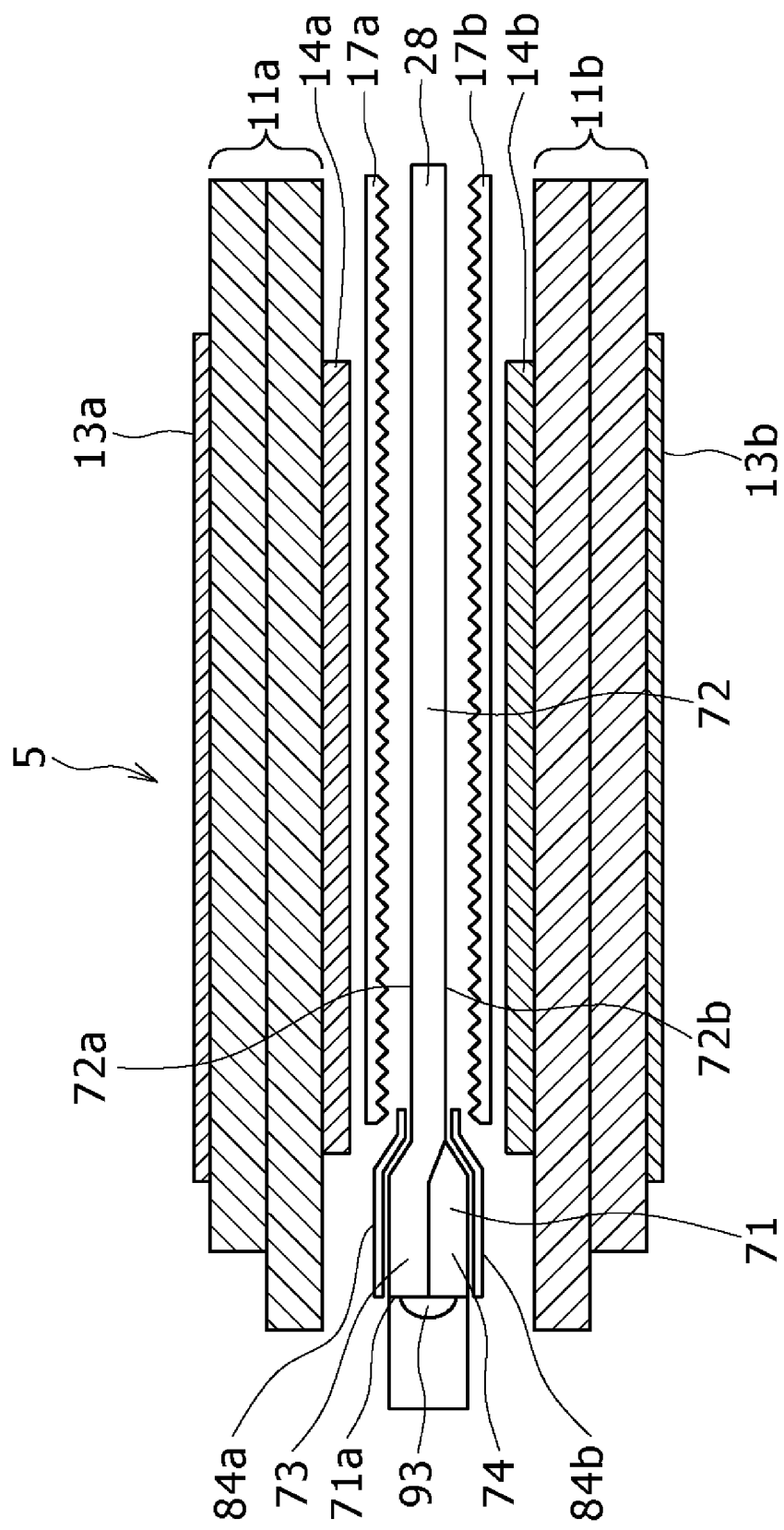

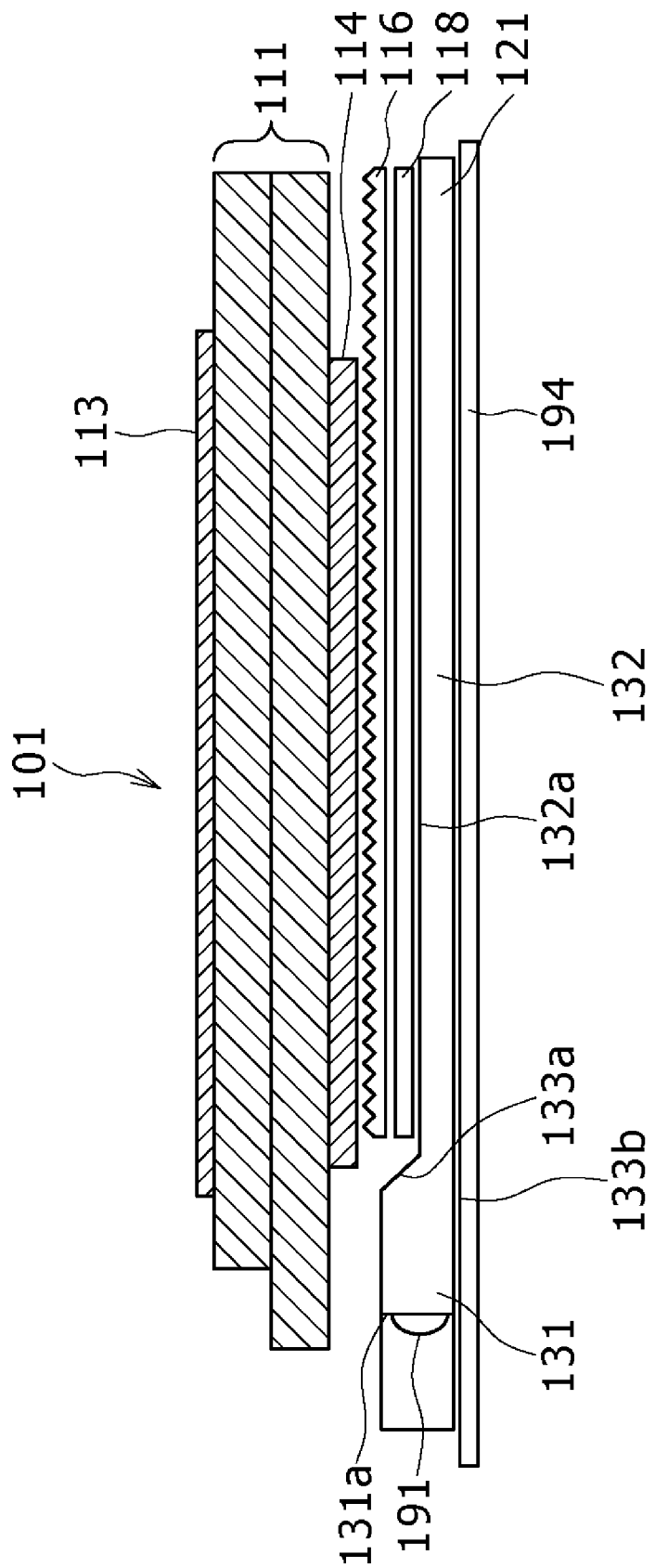

LIGHT GUIDE PLATE, DISPLAY DEVICE, AND ELECTRONIC APPARATUS WITH DISPLAY

BACKGROUND OF THE INVENTION

1. Field of the Invention

The present invention relates to a light guide plate by which light being incident from a light source is let go out in a direction perpendicular to the direction of incidence, a display device, and an electronic apparatus with a display. More particularly, the invention relates to a technology by which the light guide efficiency of a light guide plate can be enhanced.

2. Description of the Related Art

Hitherto, there has been known a light guide plate which receives light incident from a light source, guides the incident light and lets the light go out in a direction perpendicular to the direction of incidence. Besides, such a guide plate has been widely used, for example, as an illuminating section (back light, etc.) in a liquid crystal display device.

FIG. 14 is a side view of a liquid crystal display device 101 using a light guide plate 121 according to related art.

As shown in FIG. 14, the liquid crystal display device 101 includes a light source 191, an LCD (liquid crystal display) 111 in which the contents being displayed on the front side (the upper side in FIG. 14) thereof is made clearly visible by irradiation with the light of the light source 191, and a light guide plate 121 by which the light from the light source 191 is guided to the back side (the lower side in FIG. 14) of the LCD 111. Incidentally, a polarizing plate 113 is disposed on the front side of the LCD 111, and a polarizing plate 114 is disposed on the back side of the LCD 111. In addition, a lens sheet 116 and a diffuser 118 are sequentially arranged between the polarizing plate 114 and the light guide plate 121. Further, a back reflector 194 is disposed on the back side of the light guide plate 121.

In the liquid crystal display device 101 as above, the light source 191 is disposed to face a side end face 131a of an incoming part 131 of the light guide plate 121. Therefore, upon incidence on the side end face 131a, the light from the light source 191 is guided through the incoming part 131 into a main body part 132, and is let go out from a flat principal surface 132a toward the back surface of the LCD 111. In other words, the light guide plate 121 constitutes a back light for the LCD 111.

Here, for making the liquid crystal display device 101 smaller in size, the light guide plate 121 is reduced in thickness at the main body part 132 located on the back side of the LCD 111. On the other hand, for securing a sufficient amount of light, the thickness of the incoming part 131 is set large on the side of the side end face 131a, in conformity with the light source 191 which is comparatively large in size. Therefore, the front surface of the incoming part 134 has an inclined front surface 133a which is inclined from the side end face 131a toward the principal surface 132a. In addition, the back surfaces of the incoming part 131 and the main body part 132 constitute a flat back surface 133b.

Thus, in the light guide plate 121 according to the related art, the thickness of the incoming part 131 on the side of the side end face 131a is greater than the thickness of the main body part 132, and both the parts are connected to each other through the inclined front surface 133a and the flat back surface 133b. Therefore, there has been a problem that light leaks through the inclined front surface 133a, whereby the light guide efficiency of the light guide plate 121 is lowered.

FIGS. 15A and 15B illustrate the conditions of generation of light leakage due to the light guide plate 121 in the related art.

Incidentally, FIG. 15A schematically illustrates the path of a ray of light coming from the light source 191 and entering the light guide plate 121, whereas FIG. 15B illustrates simulational determination of various paths of rays of light from the light source 191.

As shown in FIG. 15A, when a ray of light coming from the light source 191 and being incident on the incoming part 131 of the light guide plate 121 (a ray of light parallel to the principal surface 132a of the main body part 132) passes through the side end face 131a and impinges on the inclined front surface 133a (set at angle θ against the principal surface 132a), the ray of light is reflected (at reflection angle θ) on the inclined front surface 133a, and is then reflected (at reflection angle 2θ) on the flat back surface 133b. Thereafter, the ray of light impinges again on the inclined front surface 133a; in this instance, if the angle of impingement on the inclined front surface 133a is greater than a critical angle for total reflection, the light would leak through the inclined front surface 133a.

FIG. 15B shows the simulationally determined conditions of light leakage. As is seen from the figure, if the incoming part 131 is configured to have the inclined front surface 133a and the flat back surface 133b, much light leaks through the inclined front surface 133a. According to the simulation results, it is seen that when the plate thickness at the side end face 131a is 0.5 mm and the thickness of the main body part 132 is 0.25 mm, 26% of the incident light is lost through the inclined front surface 133a before reaching the principal surface 132a, and the total light guide efficiency determined taking other losses also into account is as low as 64%. Incidentally, on the side of the flat back surface 133b, the back reflector 194 for reflecting the leaking light is arranged, so that light leakage does not occur on this side.

In view of the foregoing, the present applicant has already proposed a technology by which the light guide efficiency of a light guide plate can be enhanced. In the technology, an incoming part, at a side end face opposed to a light source, of a light guide plate is split into a plurality of portions stacked in the thickness direction, these split portions are mutually staggered sideways along a direction parallel to a principal surface of the light guide plate by lateral light guide parts and flat light guide parts, and light is bent in the thickness direction and guided to a main body part of the light guide plate by a bent light guide part of which plain surfaces on opposite sides are substantially parallel to each other (refer to, for example, Japanese Patent Laid-Open No. 2006-351511, hereinafter referred to as Patent Document 1).

SUMMARY OF THE INVENTION

Even according to the technology disclosed in Patent Document 1, however, the leakage of light from the bent light guide part cannot be prevented perfectly, and, therefore, a further enhancement of the light guide efficiency of light guide plates is being requested.

Accordingly, there is a need for a technology by which the light guide efficiency of a light guide plate can be further enhanced.

According to one embodiment of the present invention, there is provided a light guide plate including: a side end face on which light from a light source is incident; an incoming part which forms the side end face and by which the light coming in through the side end face is guided; a principal surface which is formed in a direction perpendicular to the side end face and through which the light guided by the incoming part is let go out; and a main body part which forms the principal surface and which is continuous with the incoming part on the opposite side from the side end face; wherein the incoming part is so formed as to have a thickness on the side end face side greater than the thickness of the main body part, and has a bent light guide part by which the light coming in through the side end face outside the range of thickness of the main body part is guided into the range of thickness of the main body part while being changed in direction, the bent light guide part has an inclined front surface which is so inclined that a surface in a direction perpendicular to the side end face is continuous with the principal surface, and an inclined back surface inclined on the opposite side from the inclined front surface so as to be parallel to the inclined front surface; and a reflecting member is provided which is disposed along the outside of at least one of the inclined front surface and the inclined back surface and by which the light leaking from the bent light guide part is reflected toward the bent light guide part or the main body part.

According to another embodiment of the present invention, there is provided a display device including the above-mentioned light guide plate, a light source, and a display in which the contents being displayed are made clearly visible by irradiation (illumination) with the light of the light source.

According to a further embodiment of the present invention, there is provided an electronic apparatus with a display, including the above-mentioned light guide plate, a light source, a display in which the contents being displayed are made clearly visible by irradiation (illumination) with the light of the light source, and an electronic controller operable to electronically controlling the light source and the display.

Since the incoming part of the light guide plate is so formed that its thickness on the side of the side end face is greater than the thickness of the main body part of the light guide plate. Therefore, the thickness of the main body part opposed to the display can be made thinner, and the display device can be reduced in size, while securing a sufficient amount of light entering the incoming part through the side end face.

In addition, the bent light guide part has the inclined front surface which is so inclined that a surface in the direction perpendicular to the side end face is continuous with the principal surface of the main body part, and the inclined back surface inclined on the opposite side from the inclined front surface so as to be parallel to the inclined front surface. Therefore, the light reflected inside the bent light guide plate is unlikely to leak to the exterior of the bent light guide part.

Further, the light guide plate is provided with the reflecting member which is disposed along at least one of the inclined front surface and the inclined back surface and by which the light leaking from the bent light guide part is reflected toward the bent light guide part or the main body part. Therefore, the light leaking from the bent light guide part is reflected by the reflecting member, to enter the bent light guide part or the main body part. The light is thereafter let go out through the principal surface toward the display.

Thus, according to the embodiments of the present invention, the display device can be made smaller in size, and it is ensured that the light reflected in the bent light guide part of the light guide plate is unlikely to leak to the outside of the bent light guide part. Therefore, a light guide plate with an enhanced light guide efficiency can be realized. Further, the light leaking from the bent light guide part is reflected by the reflecting member, to again enter the bent light guide part or to enter the main body part. Accordingly, the light guide efficiency of the light guide plate is further enhanced.

BRIEF DESCRIPTION OF THE DRAWINGS

FIG. 11 is a side view of a back irradiation type liquid crystal display device using a light guide plate according to a sixth embodiment of the present invention;

FIG. 13 is a side view of a back irradiation type liquid crystal display device using a light guide plate according to an eighth embodiment of the present invention;

FIG. 14 is a side view of a liquid crystal display device using a light guide plate according to related art.

DETAILED DESCRIPTION OF THE PREFERRED EMBODIMENTS

Figure 1:
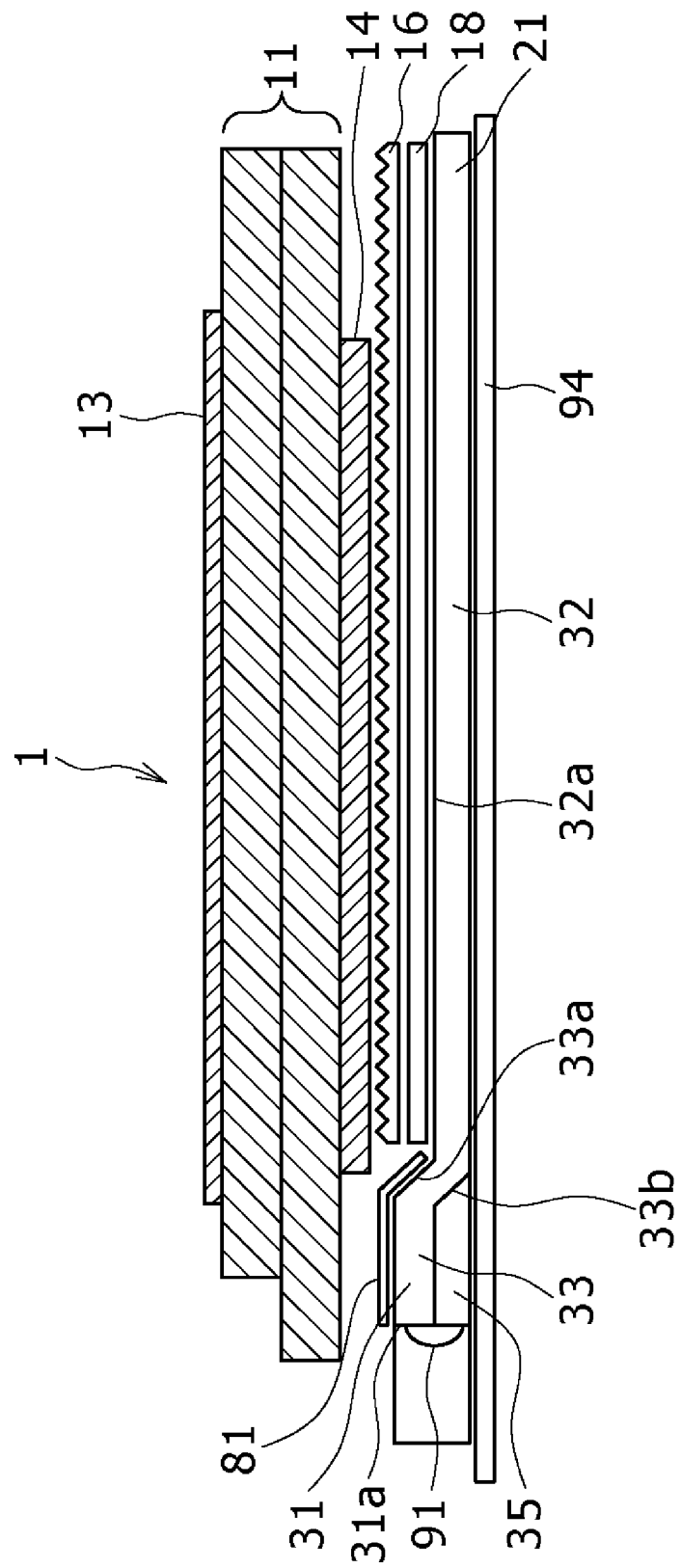
FIG. 1 is a side view of a back irradiation type liquid crystal display device using a light guide plate according to a first embodiment of the present invention.

Now, embodiments of the present invention will be described below referring to the drawings.

FIG. 1 is a side view of a back irradiation type liquid crystal display device 1 (corresponding to the display device in the present invention) using a light guide plate 21 according to a first embodiment of the invention.

As shown in FIG. 1, the back irradiation type liquid crystal display device 1 has an LCD (liquid crystal display) 11 (corresponding to the display in the present invention) in which liquid crystals are sealed between a pair of glass plates. A polarizing plate 13 and a polarizing plate 14 are disposed on the front side (the upper side in FIG. 1) and the back side (the lower side in FIG. 1) of the LCD 11.

In addition, a lens sheet 16 (corresponding to the lens member in the present invention) in which lenses being ridge-shaped in section are arrayed in the width direction is disposed so as to face the polarizing plate 14. Further, a diffuser 18 is disposed on the back side of the lens sheet 16, and a transparent light guide plate 21 for constituting a back light for the LCD 11 is disposed on the back side of the diffuser 18. Furthermore, light sources 91 including LEDs (light emitting diodes) are disposed on the side of a side end face 31a of the light guide plate 21.

Here, the light guide plate 21 includes an incoming part 31 which forms the side end face 31a and by which light coming in through the side end face 31a is guided, and a main body part 32 which forms a principal surface 32a and which is continuous with the incoming part 31 on the opposite side from the side end face 31a. The thickness of the incoming part 31 on the side end face 31a side is larger than the thickness of the main body part 32; specifically, in the light guide plate 21 in the first embodiment, the thickness thereof on the side end face 31a side is two times the thickness of the main body part 32. In addition, the incoming part 31 has a bent light guide part 33 by which the light coming in through the side end face 31a outside the range of thickness of the main body part 32 is guided into the range of thickness of the main body part 32 while being changed in direction, and a flat light guide part 35 by which the light coming in through the side end face 31a within the range of thickness of the main body part 32 is guided into the range of thickness of the main body part 32.

Therefore, the light from the light sources 91 enters the light guide plate 21 through the side end face 31a of the light guide plate 21, and is guided into the main body part 32 by the bent light guide part 33 and the flat light guide part 35 which constitute the incoming part 31. Then, the light guided into the main body part 32 is let go out toward the LCD 11 through the principal surface 32a formed in the direction perpendicular to the side end face 31a. Incidentally, the perpendicular direction is not limited to the case where the angle formed between the side end face 31a and the principal surface 32a is 90°, and means a situation in which the side end face 31a and the principal surface 32a are in such a positional relationship that, for example, the light coming in from a lateral direction (through the side end face 31a) is let go out in an upward direction (through the principal surface 32a).

Thus, the light guide plate 21 of the first embodiment is so configured that the light coming from the light sources 91 disposed to face the side end face 31a of the incoming part 31 is let go out through the principal surface 32a of the main body part 32 while being changed in direction by about 90° from the direction of incidence. In addition, the thickness of the incoming part 31 on the side end face 31a side is twice the thickness of the main body part 32. Specifically, since the thickness of the incoming part 31 is set large on the side of the side end face 31a on which the light from the light sources 91 is incident, it is possible to secure a large quantity of light entering the incoming part 31 through the side end face 31a.

Further, the bent light guide part 33 has an inclined front surface 33a which is so inclined that a surface in the direction perpendicular to the side end face 31a is continuous with the principal surface 32a, and an inclined back surface 33b which is inclined on the opposite side from the inclined front surface 33a so as to be parallel to the inclined front surface 33a. Therefore, the light entering the bent light guide part 33 is reflected between the inclined front surface 33a and the inclined back surface 33b, and is unlikely to leak to the exterior of the bent light guide part 33. To be more specific, the light coming in through the side end face 31a outside the range of thickness of the main body part 32 is guided by the bent light guide part 33 into the main body part 32 while being changed in direction from the incidence direction into the range of thickness of the main body part 32. On the other hand, the light coming in through the side end face 31a within the range of thickness of the main body part 32 is guided by the flat light guide part 35 into the range of thickness of the main body part 32 while remaining unchanged in direction.

Besides, near the bent light guide part 33 of the light guide plate 21, a front reflecting member 81 (corresponding to the reflecting member in the present invention) is disposed along the outside of the inclined front surface 33a. Therefore, the light leaking from the inclined front surface 33a is reflected by the front reflecting member 81 toward the bent light guide part 33 or the main body part 32. Furthermore, a back reflector 94 is disposed on the back side of the main body part 32, so that the light leaking from the back surface of the main body part 32 is reflected by the back reflector 94 toward the main body part 32.

Therefore, according to the liquid crystal display device 1 shown in FIG. 1, the light of the light sources 91 coming in through the side end face 31a is guided into the main body part 32 at good light guide efficiency by the bent light guide part 33, the flat light guide part 35 and the front reflecting member 81 of the light guide plate 21, and is let go out through the principal surface 32a. Consequently, the light let go out through the principal surface 32a advances in the direction perpendicular to the side end face 31a (upwards in FIG. 1), and is radiated onto the LCD 11 through the diffuser 18 and the lens sheet 16. Then, this provides a back light for the LCD 11, whereby the contents being displayed on the LCD 11 are made to be clearly visible.

Besides, since the main body part 32 opposed to the LCD 11 is small in thickness, the liquid crystal display device 1 can be reduced in size (reduced in thickness). Therefore, by electronically controlling the LCD 11 and the light sources 91 by an electronic controller (not shown) so that various images, characters and the like can be displayed on the LCD 11, the liquid crystal display device 1 is made to be suitable for mobile apparatuses (corresponding to the electronic apparatus in the present invention) such as mobile phones.

Figure 2:
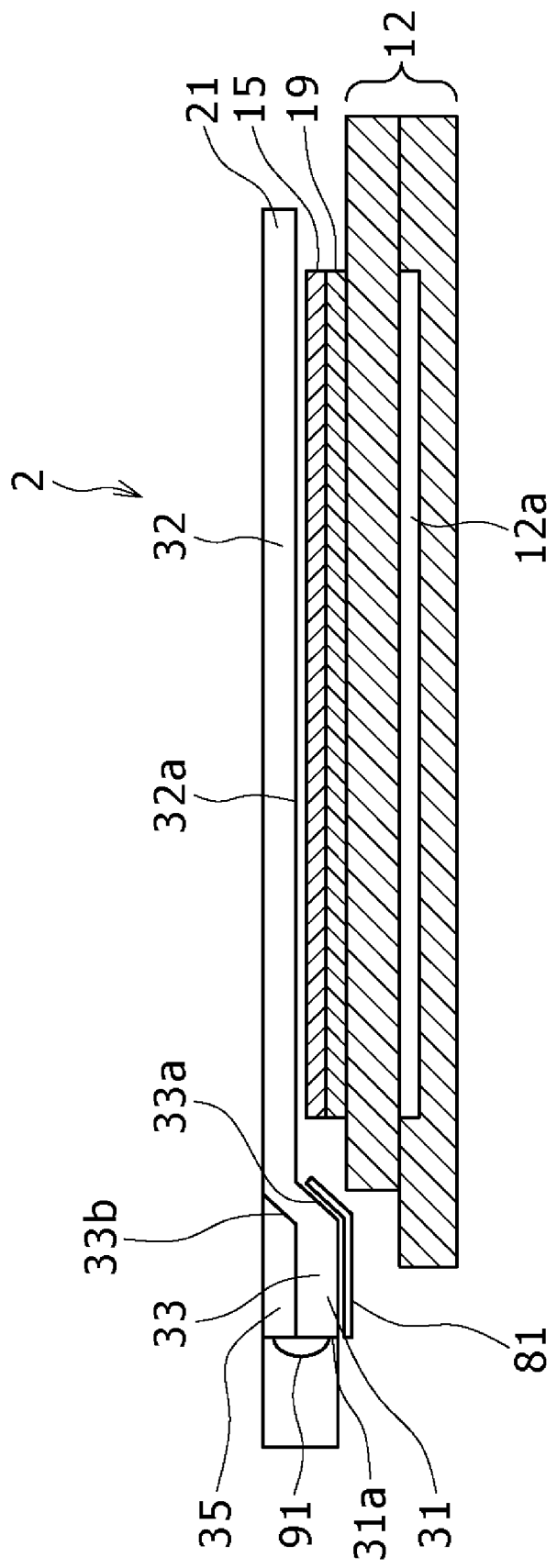
FIG. 2 is a side view of a front irradiation type liquid crystal display device using the light guide plate according to the first embodiment.

FIG. 2 is a side view of a front irradiation type liquid crystal display device 2 using the light guide plate 21 according to the first embodiment.

As shown in FIG. 2, for the front irradiation type liquid crystal display device 2, an LCD 12 is used which has liquid crystals sealed therein and which has an inner reflective layer 12a at the inner surface of a glass plate on one side. In addition, a phase difference plate 19 is disposed on the front side (the upper side in FIG. 2) of the LCD 11, and a polarizing plate 15 is arrange on the further front side of the phase difference plate 19. Besides, a transparent light guide plate 21 which is the same as that in the liquid crystal display device 1 shown in FIG. 1 is disposed, upside down, on the front side (the frontmost side) of the polarizing plate 15.

Here, even though disposed upside down, the light guide plate 21 guides the light from light sources 91 coming in through a side end face 31a to a principal surface 32a of a main body part 32. Specifically, the light coming in through the side end face 31a outside the range of thickness of the main body part 32 is guided by a bent light guide part 33 into the main body part 32 while being changed in direction from the incidence direction into the range of the thickness of the main body part 32. In addition, the light leaking on the side of an inclined front surface 33a of the bent light guide plate 33 is reflected by a surface reflecting member 81 toward the bent light guide part 33 or the main body part 32. Further, the light coming in through the side end face 31a within the range of thickness of the main body part 32 is guided by a flat light guide part 35 into the range of thickness of the main body part 32 while remaining unchanged in direction.

According to the liquid crystal display device 2 as above, the light of the light sources 91 disposed so as to face the side end face 31a of the light guide plate 21 is guided through an incoming part 31 into the main body part 32 at a good light guide efficiency, and is let go out through the principal surface 32a. Then, the light let go out from the principal surface 32a advances in the direction perpendicular to the side end face 31a (downwards in FIG. 2), to enter the LCD 12 through the polarizing plate 15 and the phase difference plate 19.

Besides, the light entering the LCD 12 is reflected by the inner reflective layer 12a provided inside the LCD 12, and is let go out upward this time. Then, it is possible to see the light let go out through the transparent light guide plate 21, so that the contents displayed on the LCD 12 is made to be clearly visible. In addition, the side end face 31a where the light guide plate 21 is thick makes it possible to secure a sufficient quantity of light coming into an incoming part 31, and the main body part 32 which is thin makes it possible for the liquid crystal display device 2 to be smaller in size (smaller in thickness).

Figure 3:
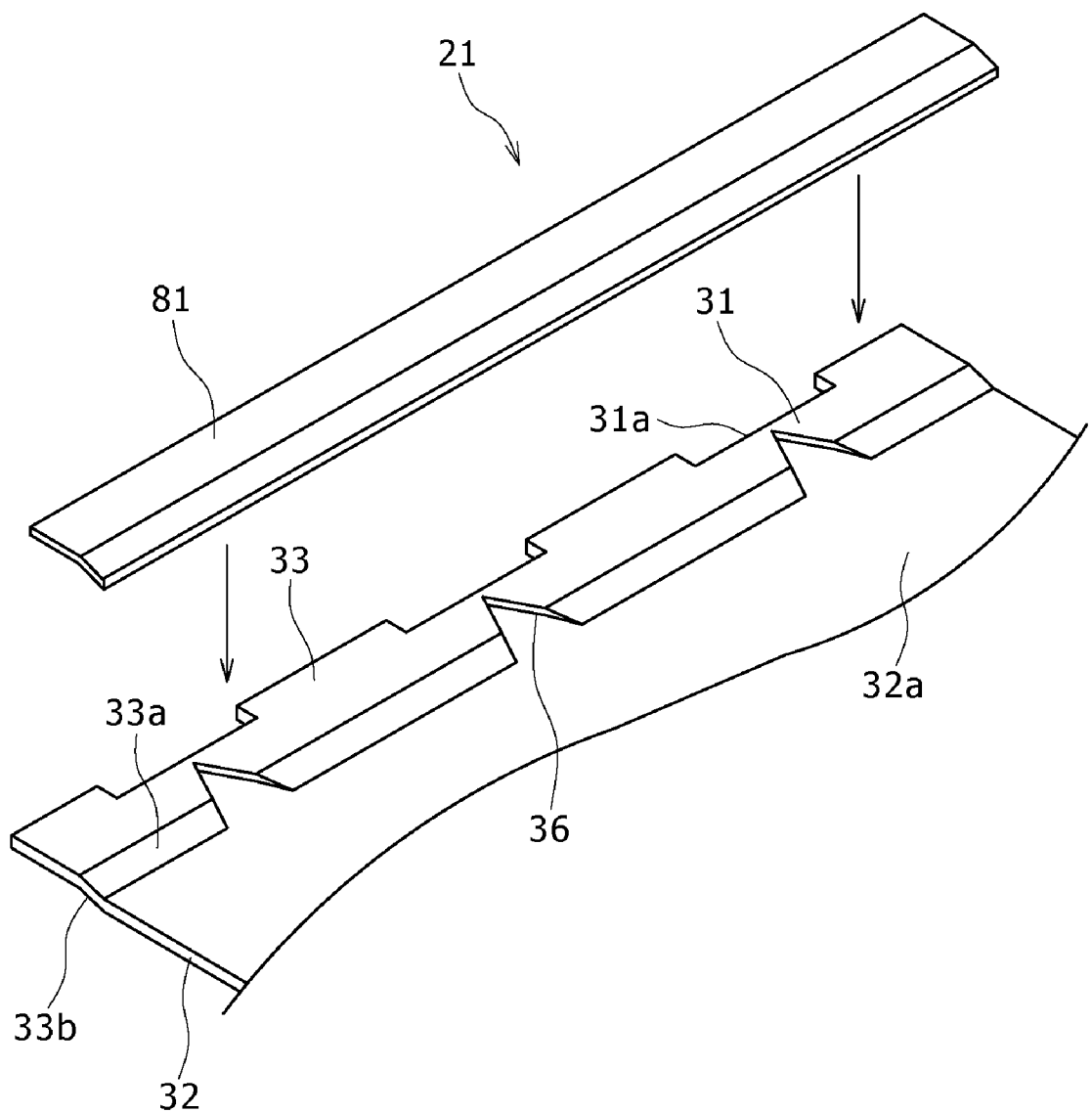
FIG. 3 is a front-side perspective view showing a main part of the light guide plate according to the first embodiment.

FIG. 3 is a front-side perspective view showing a main part of the light guide plate 21 in the first embodiment shown in FIGS. 1 and 2.

Figure 4:
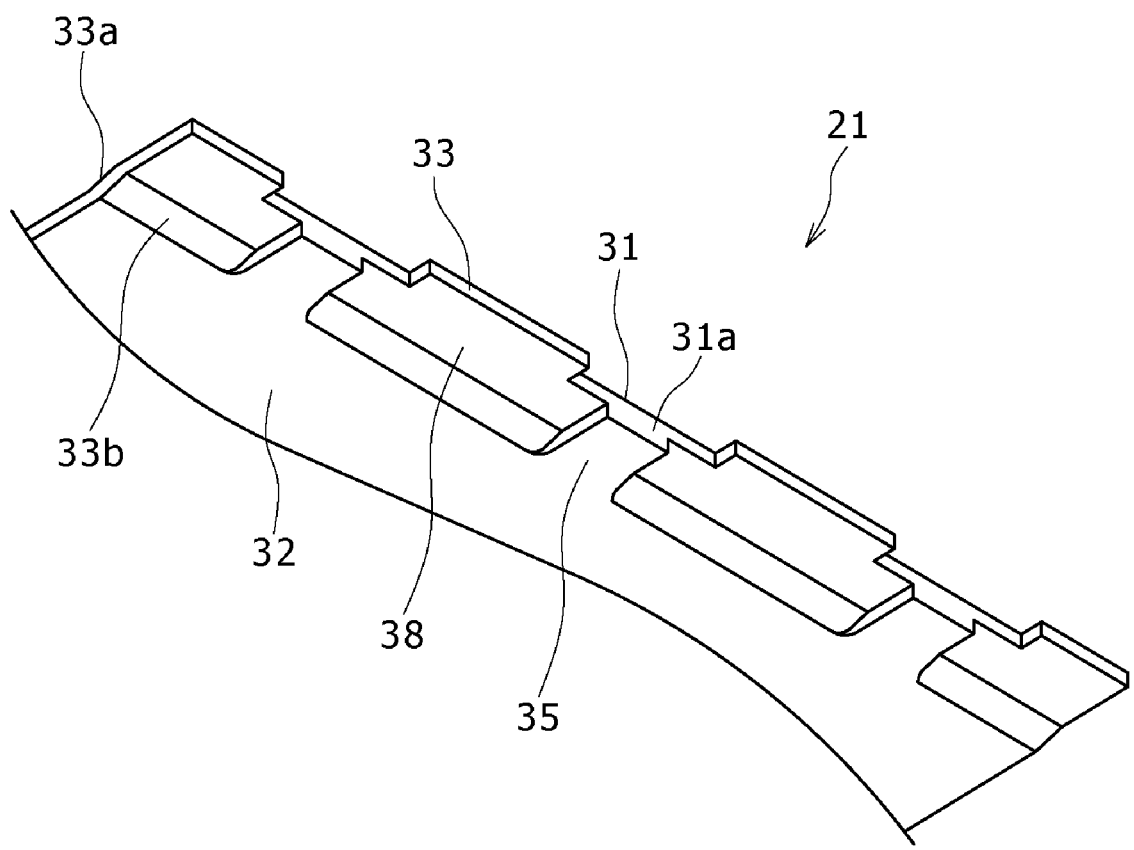
FIG. 4 is a back-side perspective view showing a main part of the light guide plate according to the first embodiment.

In addition, FIG. 4 is a back-side perspective view showing a main part of the light guide plate 21 in the first embodiment shown in FIGS. 1 and 2.

Incidentally, while the condition where the front reflecting member 81 is separated from the bent light guide part 33 is shown in FIG. 3 for convenience of description, in the actual assembly the front reflecting member 81 is arranged along the outside of the inclined front surface 33a as indicated by arrows.

The light guide plate 21 according to the first embodiment can operate so that the light from three light sources 91 (see FIGS. 1 and 2) is radiated onto the LCD 11 (see FIG. 1) or the LCD 12 (see FIG. 2). Therefore, as shown in FIGS. 3 and 4, the light guide plate 21 includes three side end faces 31a permitting incidence of light from the light sources 91, an incoming part 31 which forms the side end faces 31a and which guides the light coming in through the side end faces 31a, a principal surface 32a (see FIG. 3) which is formed in the direction perpendicular to the side end faces 31a and through which the light guided by the incoming part 31 is let go out, and a main body part 32 which forms the principal surface 32a and which is continuous with the incoming part 31 on the opposite side from the side end faces 31a. Besides, the main body part 32 is formed to be greater in width than the side end faces 31a.

Here, the incoming part 31 is formed to be thicker on the side of the side end faces 31a than at the main body part 32. In addition, the incoming part 31 has a bent light guide part 33 by which the light coming in through the side end faces 31a outside the range of thickness of the main body part 32 is guided into the range of thickness of the main body part 32 while being changed in direction. Besides, the bent light guide part 33 is formed to spread in the width direction of the main body part 32, and has an inclined front surface 33a which is so inclined that a surface in the direction perpendicular to the side end faces 31a is continuous with the principal surface 32a, and an inclined back surface 33b which is so inclined as to be parallel to the inclined front surface 33a on the opposite side from the inclined front surface 33a.

Further, the incoming part 31 is provided in the bent light guide part 33 with V-shaped lateral light guide parts 36 (see FIG. 3) by which the light coming in through the side end faces 31a is guided while being changed in direction along the width direction of the main body part 32. Besides, the lateral light guide part 36 is disposed within the range for facing each light source 91 (see FIGS. 1 and 2) in such a manner that its V-shaped base portion side is directed toward the light source 91.

Furthermore, the incoming part 31 has flat light guide parts 35 (see FIG. 4) by which the light coming in through the side end faces 31a within the range of thickness of the main body part 32 is guided into the range of thickness of the main body part 32. Besides, the flat light guide part 35 is disposed within the range for facing each light source 91 (see FIGS. 1 and 2). Therefore, within the range for facing each light source 91, each side end face 31a is formed by the bent light guide part 33 on the upper side and the flat light guide part 35 on the lower side. Incidentally, since the flat light guide part 35 is absent, for example, between the side end faces 31a, the inclined back surface 33b side of the bent light guide parts 33 forms space parts 38 (see FIG. 4).

Thus, the light guide plate 21 according to the first embodiment includes the bent light guide parts 33 on the front side of the incoming part 31, the lateral light guide parts 36 (see FIG. 3) in the bent light guide part 33, and the flat light guide parts 35 (see FIG. 4) on the back side. Therefore, the light coming in through the side end faces 31a outside the range of thickness of the main body part 32 is guided by the bent light guide parts 33 into the range of thickness of the main body part 32, and is guided by the lateral light guide parts 36 into the main body part 32 on both sides of the flat light guide parts 35. In addition, the light coming in through the side end faces 31a within the range of thickness of the main body part 32 is guided by the flat light guide parts 35 into the main body part 32 while remaining unchanged in direction.

Accordingly, the light guided mainly by the flat light guide parts 35 (see FIG. 4) comes into the main body part 32 facing the side end face 31a, whereas the light guided mainly by the belt light guide parts 33 and the lateral light guide parts 36 (see FIG. 3) comes into the main body part 32 facing the portions between the side end faces 31a. As a result, the light coming in through the side end faces 31a is diffused throughout the main body part 32, and is let go out through the whole area of the principal surface 32a.

Besides, the bent light guide part 33 has a front reflecting member 81 (see FIG. 3). The front reflecting member 81 is formed from a material having a light-reflecting function (for example, a silver sheet, a white polyethylene terephthalate resin, etc.), and has a shape conforming to the inclined front surface 33a side of the bent light guide part 33 (e.g., a shape obtained by bending so as to conform to the inclined front surface 33a). Therefore, by disposing the front reflecting member 81 along the outside of the inclined front surface 33a as indicated by arrows in FIG. 3, the light leaking from the bent light guide parts 33 can be reflected toward the bent light guide parts 33 or the main body part 32. As a result, leakage of light from the bent light guide parts 33 is prevented, so that the light guide efficiency of the light guide plate 21 is enhanced. Incidentally, the material of the front reflecting member 81 is not limited to the silver sheet and the white polyethylene terephthalate resin, and may be any material that has a light-reflecting function. The use of such a material is not only applicable to the light guide plate 21 in the first embodiment but also similarly applicable in other embodiments.

Figure 5A:
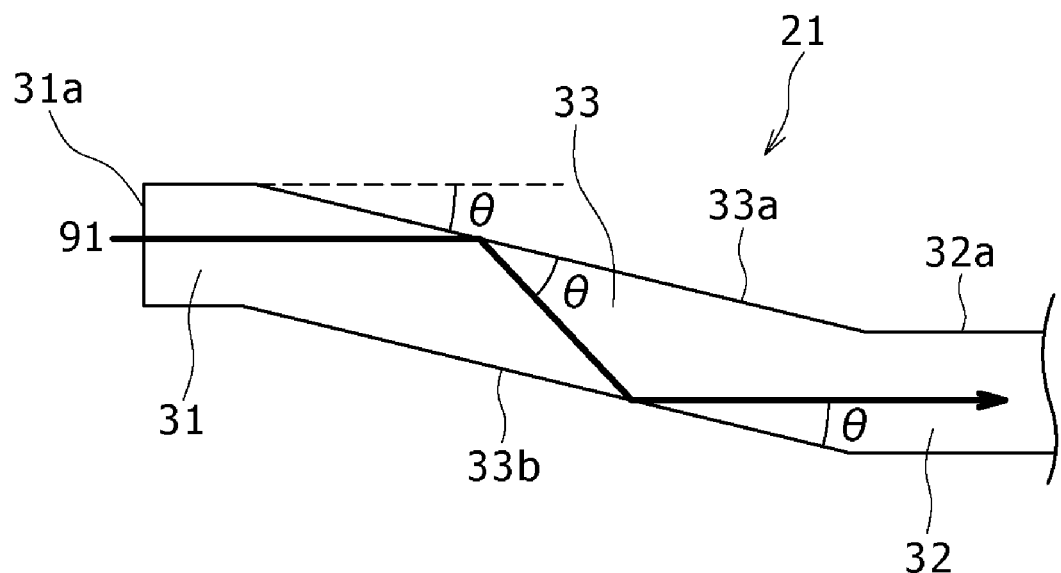
FIGS. 5A and 5B illustrate a light leakage preventing action of a bent light guide part in the light guide plate according to the first embodiment.
Figure 5B:
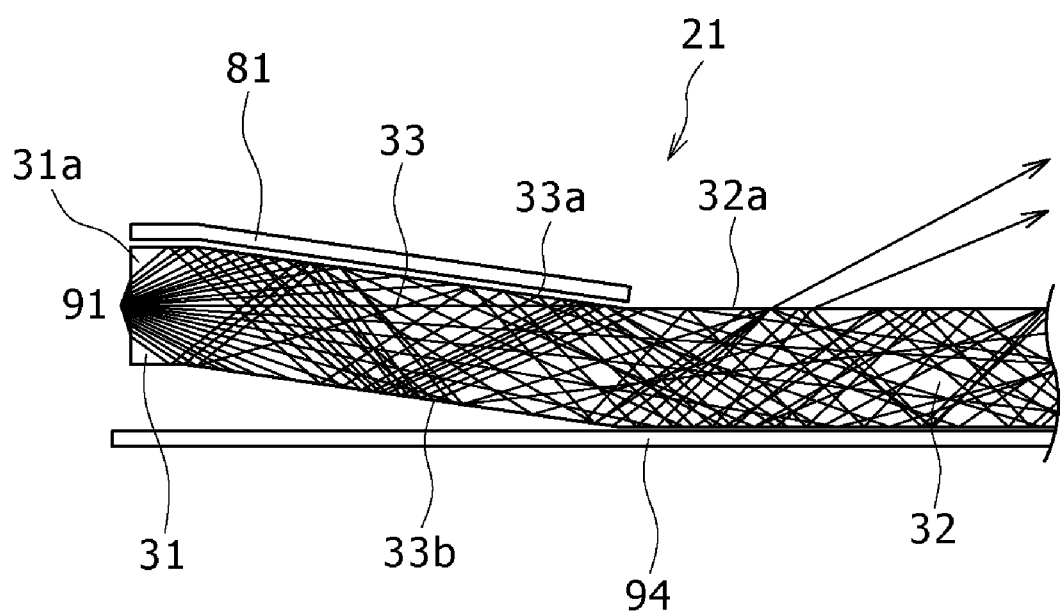

FIGS. 5A and 5B illustrate a light leakage preventing action of the bent light guide part 33 in the light guide plate 21 according to the first embodiment shown in FIGS. 3 and 4.

Incidentally, FIG. 5A schematically illustrates the path of a ray of light coming from the light source 91 and entering the light guide part 21, while FIG. 5B illustrates various paths of rays of light coming from the light source 91 which are determined by simulation.

As shown in FIG. 5A, when a ray of light coming from the light source 91 and being incident on the incoming part 31 of the light guide plate 21 (a ray of light parallel to the principal surface 32a of the main body part 32) passes through the side end face 31a and impinges on the inclined front surface 33a (inclined at angle θ against the principal surface 32a), the ray is reflected (at reflection angle θ) on the inclined surface 33a, and is then reflected (at reflection angle θ) on the inclined front back surface 33b. In this case, since the inclined back surface 33b is inclined on the opposite side from the inclined front surface 33a so as to be parallel to the inclined front surface 33a, the ray of light reflected by the inclined back surface 33b advances toward the main body part 32 in parallel to the principal surface 32a. Therefore, there is little leakage of light through the bent light guide part 33. Incidentally, the inclination of the inclined back surface 33b so as to be parallel to the inclined front surface 33a is not limited to the case where the extension of the inclined front surface 33a and the extension of the inclined back surface 33b will never intersect, but means that the inclined surfaces are in such a positional relationship that the light reflected by the inclined back surface 33b advances toward the main body part 32.

FIG. 5B shows paths of rays of light in the bent light guide part 33 which are determined by simulation. As is seen from the figure, leakage of light is substantially prevented, since the inclined front surface 33a and the inclined back surface 33b are inclined to be parallel to each other. In addition, the rays of light having leaked are reflected from the front reflecting member 81, which is disposed along the outside of the inclined front surface 33a, toward the bent light guide part 33 or the main body part 32. Incidentally, a back reflector 94 for reflecting the leaking light is disposed on the back side of the main body part 32, so that there is no leakage of light on this side.

Therefore, loss of light being guided into the main body part 32 is minimized (light is let go out through the principal surface 32a, without leaking through the inclined front surface 33a), and a very high light guide efficiency is obtained. According to the results of such a simulation, in contrast to a final light guide efficiency of the light guide plate 21 of 80% in the case where the front reflecting member 81 is not used, the light guide efficiency is enhanced to 84% in the case where a silver sheet is used as the front reflecting member 81, and the light guide efficiency is enhanced to 83% in the case where a white polyethylene terephthalate resin is used as the front reflecting member 81.

Figure 6:
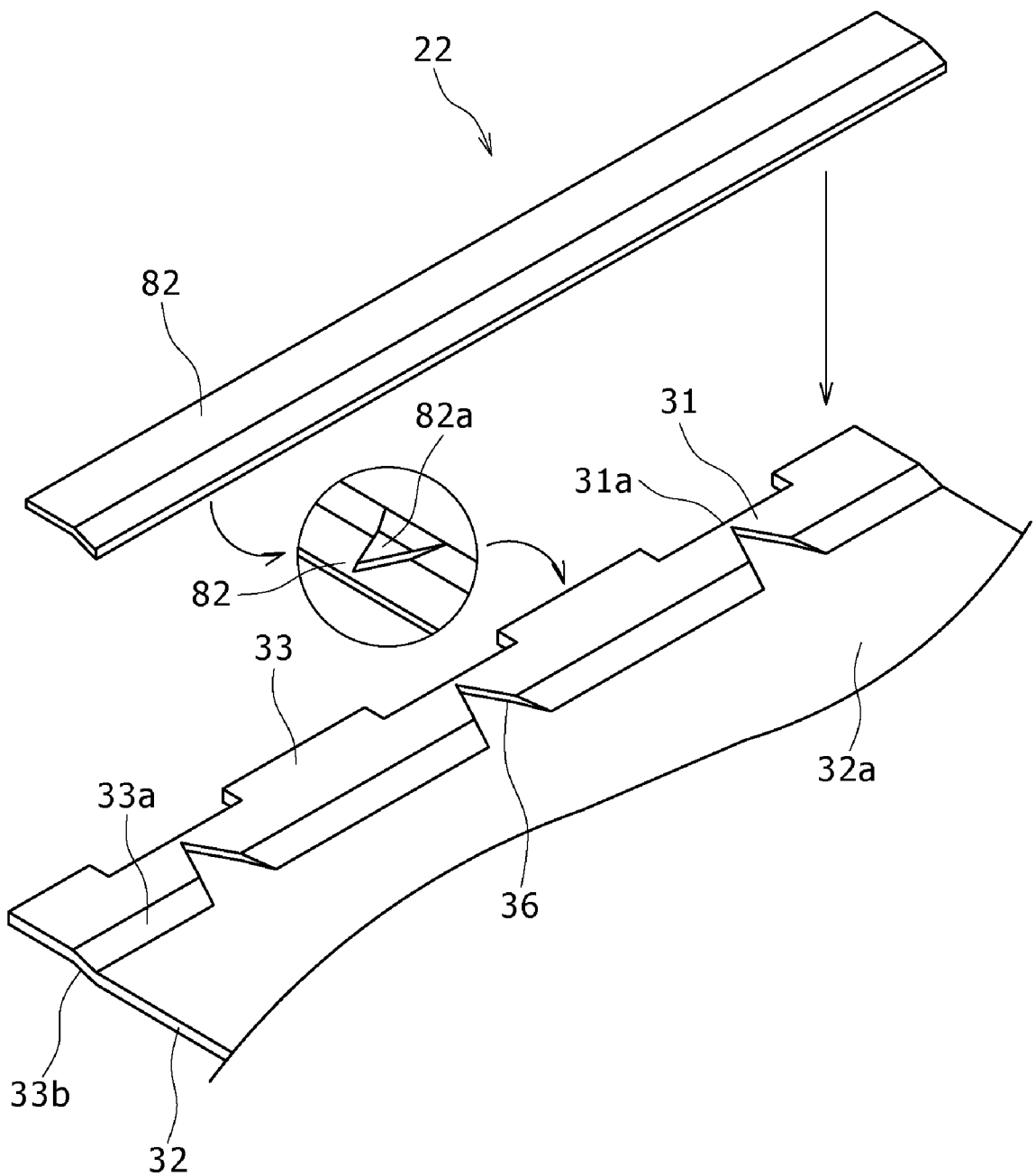
FIG. 6 is a front-side perspective view showing a main part of a light guide plate according to a second embodiment of the present invention.

FIG. 6 is a front-side perspective view showing a main part of a light guide plate 22 according to a second embodiment of the present invention.

Figure 7:
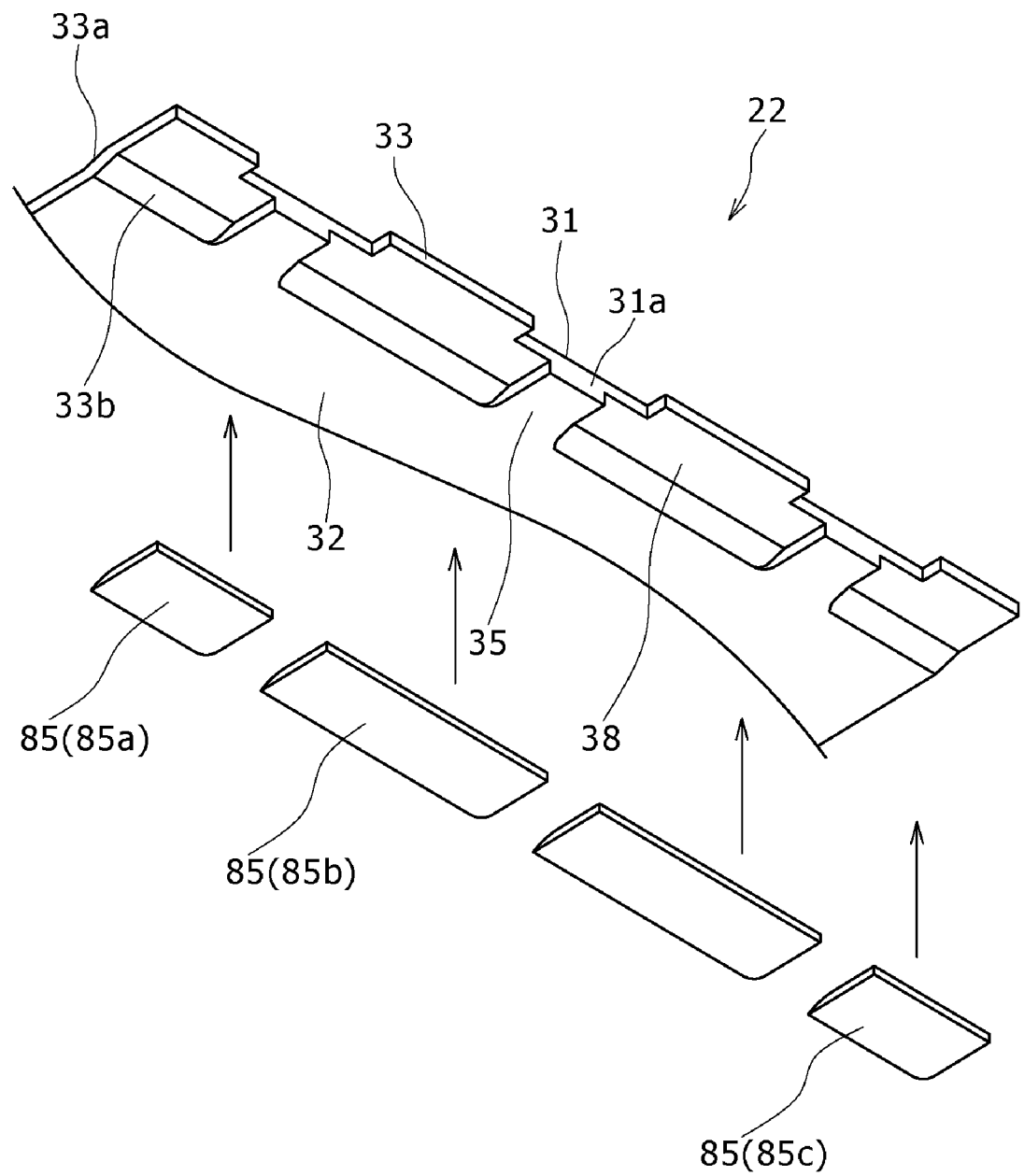
FIG. 7 is a back-side perspective view showing a main part of the light guide plate according to the second embodiment.

Besides, FIG. 7 is a back-side perspective view showing a main part of the light guide plate 22 in the second embodiment.

Incidentally, in FIGS. 6 and 7, for convenience of description, a front reflecting member 82 (see FIG. 6) and a back reflecting member 85 (see FIG. 7; corresponding to the reflecting member in the present invention) are illustrated in the state of being separated from a bent light guide part 33. Actually, however, the front reflecting member 82 is arranged along the outside of an inclined front surface 33a, and the back reflecting member 85 is arranged along the outside of an inclined back surface 33b, as indicated by arrows.

As shown in FIGS. 6 and 7, the light guide plate 22 in the second embodiment, like the light guide plate 21 (see FIGS. 3 and 4) in the first embodiment, permits the light from three light sources 91 (see FIGS. 1 and 2) to enter the light guide plate 22. Therefore, the light guide plate 22 includes three side end faces 31a, an incoming part 31 for guiding the light entering through the side end faces 31a, a principal surface 32a (see FIG. 6) through which the light guided by the incoming part 31 is let go out, and a main body part 32 formed to be wider than the width of the side end faces 31a, with these components having the same shapes as those of the light guide plate 21 in the first embodiment.

In addition, a bent light guide part 33 (an inclined front surface 33a, an inclined back surface 33b) being spread in the width direction of the main body part 32, V-shaped lateral light guide parts 36 (see FIG. 6) formed in the bent light guide part 33, a flat light guide part 35 (see FIG. 7) forming the side end faces 31a together with the bent light guide part 33, and space parts 38 (see FIG. 7) present, for example, between the side end faces 31a, which are formed in the incoming part 31, also have the same shapes as those of the light guide plate 21 (see FIGS. 3 and 4) in the first embodiment.

Here, the light guide plate 22 in the second embodiment has a front reflecting member 82 (see FIG. 6) different from that in the first embodiment, and back reflecting members 85 (see FIG. 7) which have not been provided in the first embodiment. Specifically, the front reflecting member 82, which is disposed along the outside of an inclined surface 33a of the bent light guide part 33, is three-dimensionally molded from a white polyethylene terephthalate resin having a light-reflecting function, unlike that in the first embodiment. The front reflecting member 82 is not only formed in a bent shape conforming to the inclination of the inclined front surface 33a but also provided on it back side with V-shaped projected parts 82a (see FIG. 6) conforming to the inside recesses of lateral light guide parts 36.

Therefore, when the front reflecting member 82 is arranged on the bent light guide part 33 as indicated by arrows while conforming the projected parts 82a of the front reflecting member 82 to the lateral light guide parts 36, as shown in FIG. 6, the front reflecting member 82 is set along the outside of the inclined front surface 33a, and the projected parts 82a are fitted into the lateral light guide parts 36. As a result, the light leaking on the inclined front surface 33a side of the bent light guide part 33 is reflected by the back side of the front reflecting member 82 toward the bent light guide part 33 or the main body part 32. In addition, the light leaking through the lateral light guide parts 36 is reflected by the projected parts 82a toward the lateral light guide parts 36.

Further, as shown in FIG. 7, the back reflecting members 85 are arranged on the side of flat light guide parts 35 and in the ranges where the flat light guide parts 35 are absent (in four space parts 38). Specifically, the back reflecting members 85 include three kinds (for left end, for center, and for right end) of back reflecting members 85a, 85b, 85c which are three-dimensionally molded from a white polyethylene terephthalate resin having a light-reflecting function, like the front reflecting member 82, and which have shapes and sizes conforming to the four space parts 38. When arranged in the space parts 38 as indicated by arrows, the back reflecting members 85a, 85b, 85c are set along the outside of the inclined back surface 33b. As a result, the light leaking on the inclined back surface 33b side of the bent light guide part 33 is reflected by the back reflecting members 85 (85a, 85b, 85c) toward the bent light guide part 33 or the main body part 32.

Thus, the light guide plate 22 according to the second embodiment has the front reflecting member 82 (see FIG. 6) and the back reflecting member 85 (see FIG. 7) which are arranged respectively on the outside of the inclined front surface 33a and the inclined back surface 33b and by which the light leaking through the bent light guide part 33 is reflected toward the bent light guide part 33 or the main body part 32. Therefore, loss of light being guided into the main body part 32 is minimized, and a very high light guide efficiency is obtained.

Specifically, as contrasted to a final light guide efficiency of 80% in the case where the front reflecting member 82 (see FIG. 6) and the back reflecting member 85 (see FIG. 7) are not used, the light guide efficiency is enhanced to 89%, as determined by simulation, in the case of the light guide plate 22 using both the front reflecting member 82 and the back reflecting member 85. Incidentally, in the case where only the front reflecting member 82 is used, the light guide efficiency is 87%. Therefore, the front reflecting member 82 molded three-dimensionally and provided with the projected parts 82a (see FIG. 6) is higher in light guide efficiency than the front reflecting member 81 shown in FIG. 3. In addition, in the case where only the back reflecting member 85 is used, the light guide efficiency is 82%. Thus, even when only the back reflecting member 85 is used, the light guide efficiency is enhanced.

Figure 8A:
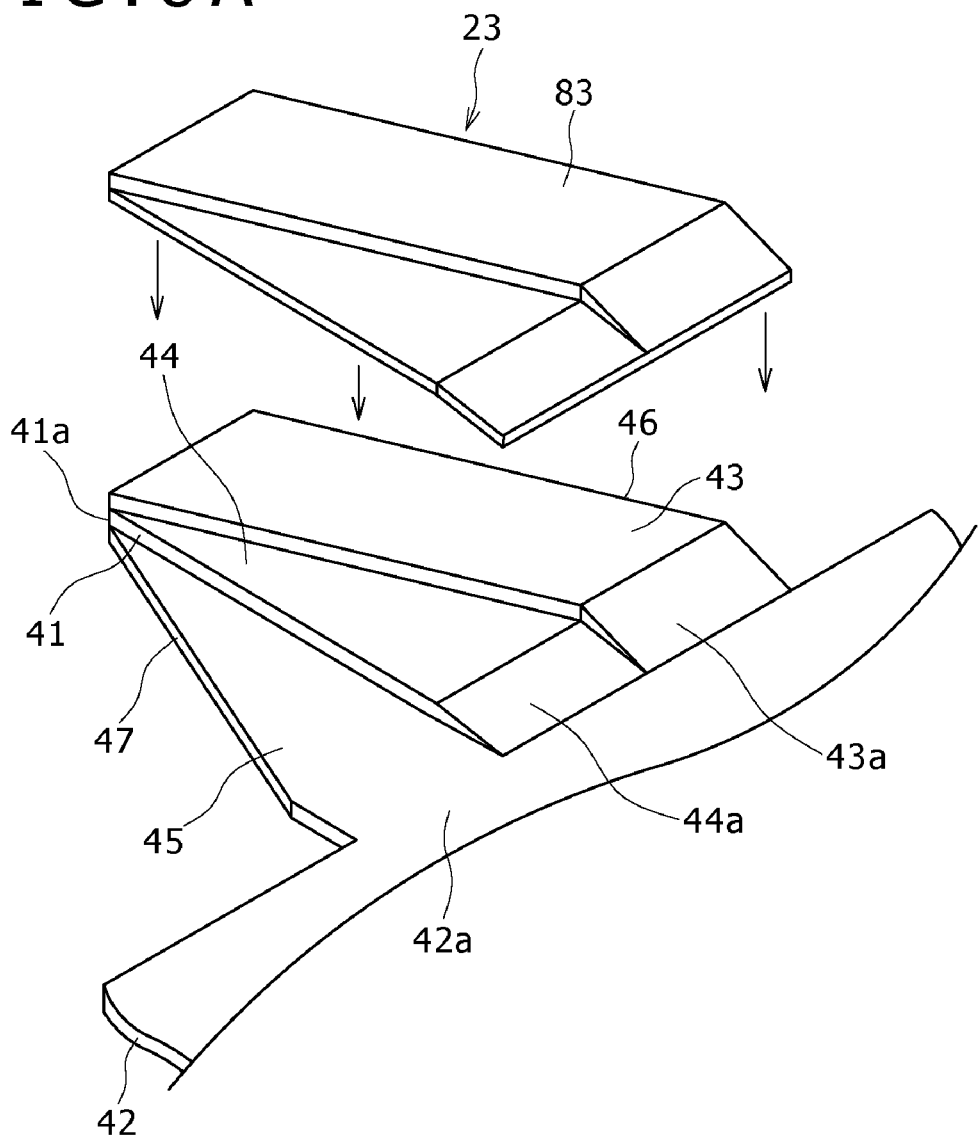
FIGS. 8A and 8B are a perspective view and a side view of a main part of a guide plate according to a third embodiment of the present invention.
Figure 8B:
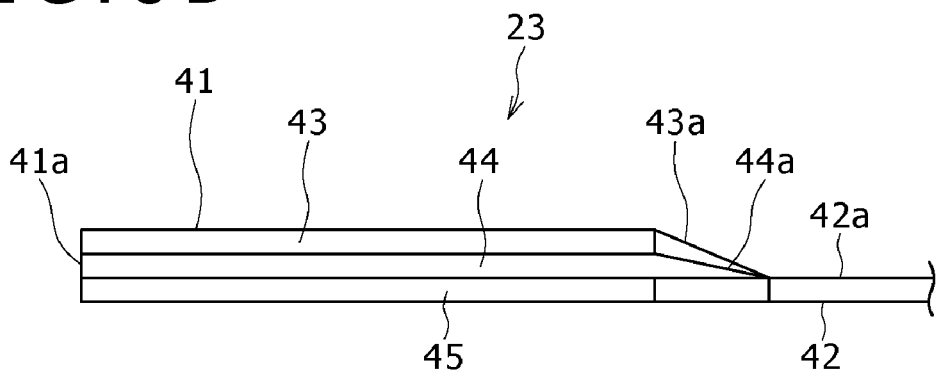

FIGS. 8A and 8B are a perspective view (FIG. 8A) and a side view (FIG. 8B) illustrating a main part of a light guide plate 23 according to a third embodiment of the present invention.

As shown in FIGS. 8A and 8B, the light guide plate 23 in the third embodiment has an incoming part 41 of which the thickness on the side of side end faces 41a is greater than the thickness of a main body part 42, specifically, three times the thickness of the main body part 42. Therefore, in the case where the thickness at the side end faces 41a is set to be equal to the thickness at the side end faces 21a of the light guide plate 21 in the first embodiment shown in FIG. 1 (namely, set to be twice the thickness of the main body 32), the thickness of the main body part 42 can be reduced more (can be reduced to a value of ⅓ times the thickness of the side end faces 41a and the side end faces 21a, instead of being reduced to a value of ½ times the thickness of the side end faces 41a, 21a).

Here, in the light guide plate 23 in the third embodiment, the main body part 42 is formed to be wider than the width of the side end faces 41a. In addition, an incoming part 41 has two bent light guide parts 43, 44 by which the light coming in through the side end faces 41a outside the range of thickness of the main body part 42 is guided into the range of thickness of the main body part 42 while being changed in direction. Specifically, the light guide plate 23 has the two bent light guide parts 43, 44 which are adjacent to each other along the thickness direction of the incoming part 41. The bent light guide part 43 on the upper side has a lateral light guide part 46 by which the light coming in through the side end face 41a is guided while being changed in direction along the width direction (in the rightward direction in FIG. 8) of the main body part 42. On the other hand, the bent light guide part 44 on the lower side guides the light, coming in through the side end face 41a, into the main body part 42 without changing the direction of the light in the width direction. Consequently, the bent light guide part 43 on the upper side and the bent light guide part 44 on the lower side are so arranged as not to overlap with each other in the width direction of the main body part 42, due to the presence of the lateral light guide part 46 of the bent light guide part 43.

Further, the incoming part 41 has a flat light guide part 45 by which the light coming in through the side end face 41a within the range of thickness of the main body part 42 is guided into the range of thickness of the main body part 42 while remaining unchanged in direction. In addition, the flat light guide part 45 has a lateral light guide part 47 by which the light coming in through the side end face 41a is guided while being changed in direction along the width direction (in the leftward direction in FIG. 8) of the main body part 42. Consequently, the flat light guide part 45 and the bent light guide part 44 are so arranged as not to overlap with each other in the width direction of the main body part 42, due to the presence of the lateral light guide part 47 of the flat light guide part 45.

Therefore, while the light guided by the bent light guide parts 43, 44 and the flat light guide part 45 enters the main body part 42, the light in the bent light guide part 43 is changed in direction toward the rightward direction of the bent light guide part 44 by the lateral light guide part 46, and the light in the flat light guide part 45 is changed in direction toward the leftward direction of the bent light guide part 44 by the lateral light guide part 47. As a result, the light coming in through the side end face 41a is diffused throughout the main body part 42, to be let go out from the whole area of the principal surface 42a.

In addition, since the side end face 41a is trisected due to the presence of the bent light guide parts 43, 44 and the flat light guide part 45 and the thickness of the main body part 42 is ⅓ times the thickness at the side end face 41a, the liquid crystal display device 1 (see FIG. 1) can be further reduced in size (reduced in thickness). In addition, an increase in the number of the bent light guide parts 43 leads to an increase in the number of divisions, n, of the side end face 41a, whereby the thickness of the main body part 42 can be reduced to 1/n times the thickness at the side end face 41a. Besides, the thinning of the main body part 42 in this manner is not only applicable to the light guide plate 23 in the third embodiment but also similarly applicable in other embodiments.

Further, a front reflecting member 83 is arranged along the outside of inclined front surfaces 43a, 44a of the bent light guide parts 43, 44. The front reflecting member 83 is three-dimensionally molded from a white polyethylene terephthalate resin having a light-reflecting function. Specifically, the front reflecting member 83 is not only formed in a recessed and projected shape conforming to the step between the bent light guide part 43 and the bent light guide part 44 but also formed in a bent shape conforming to the inclinations of the inclined front surfaces 43a, 44a.

Therefore, when the front reflecting member 83 is arranged on the bent light guide parts 43, 44 as indicated by arrows, as shown in FIG. 8, the front reflecting member 83 is set along the outside of the inclined front surfaces 43a, 44a. As a result, the light leaking on the side of the inclined front surfaces 43a, 44a of the bent light guide parts 43, 44 is reflected by the front reflecting member 83 toward the bent light guide parts 43, 44 or the main body part 42. Therefore, leakage of light from the bent light guide parts 43, 44 is prevented, and the light guide efficiency of the light guide plate 23 is enhanced. Accordingly, loss of light being guided into the main body part 42 is minimized, and a very high light guide efficiency is obtained.

Figure 9A:
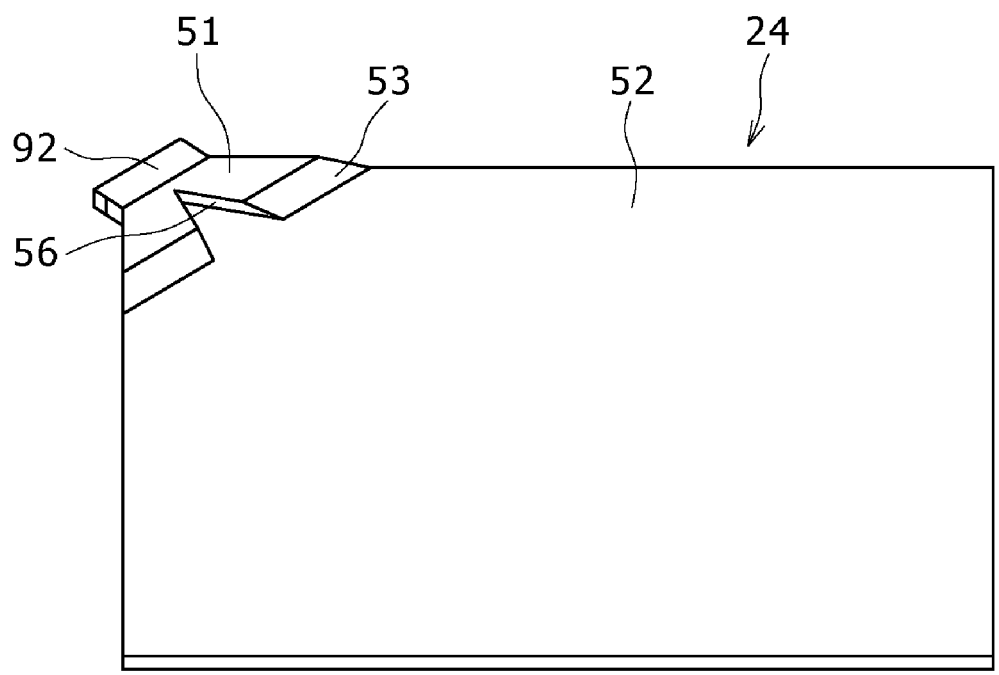
FIGS. 9A and 9B are perspective views showing a light guide plate according to a fourth embodiment of the present invention.
Figure 9B:
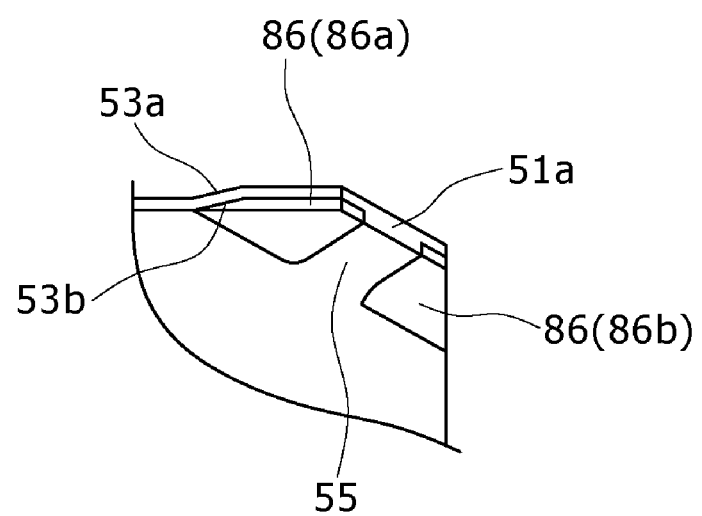

FIGS. 9A and 9B are perspective views of a light guide plate 24 according to a fourth embodiment of the present invention.

Incidentally, FIG. 9A shows the front side of the light guide plate 24, and FIG. 9B shows a part on the back side of the light guide plate 24. In FIG. 9B, a light source 92 is omitted, for convenience of description.

As shown in FIGS. 9A and 9B, the light guide plate 24 in the fourth embodiment has an incoming part 51 having a shape the same as or similar to that in the light guide plate 21 (see FIGS. 3 and 4) in the first embodiment. Specifically, the incoming part 51 is formed to be thicker on the side of a side end face 51a than at a main body part 52. In addition, the incoming part 51 has a bent light guide part 53 formed to be spread in the width direction of the main body part 52. The bent light guide part 53 includes an inclined front surface 53a, and an inclined back surface 53b which is inclined on the opposite side from the inclined front surface 53a so as to be parallel to the inclined front surface 53a. Further, the incoming part 51 is provided with a V-shaped lateral light guide part 56 in the bent light guide part 53. Furthermore, the incoming part 51 has a flat light guide part 55.

Here, the light guide plate 24 in the fourth embodiment has the incoming part 51 arranged in a corner portion of the main body part 52 in the state of being oriented diagonally. In addition, back reflecting members 86 are arranged along the outside of an inclined back surface 53b of the bent light guide part 53. Incidentally, the back reflecting members 86 include a left-right pair of back reflecting members 86a, 86b which are three-dimensionally molded from a white polyethylene terephthalate resin having a light-reflecting function.

Therefore, at the incoming part 51 arranged in the corner portion of the main body part 52, the light leaking on the side of the inclined back surface 53b of the bent light guide part 53 is reflected by the back reflecting members 86 toward the bent light guide part 56 or the main body part 52. Therefore, leakage of light through the inclined back surface 53b is prevented, and the light guide efficiency of the light guide plate 24 is enhanced. In addition, the light of the light source 92 coming in through the side end face 51a is reflected in the left-right direction of the main body part 52 by lateral light guide parts 56, so that the light coming in through the side end face 51a is diffused throughout the main body part 52. As a result, loss of light being guided into the main body part 52 is minimized, a very high light guide efficiency is obtained, and, further, it is possible to realize a one-light-in-corner back light which can be reduce in thickness efficiently.

Figure 10A:
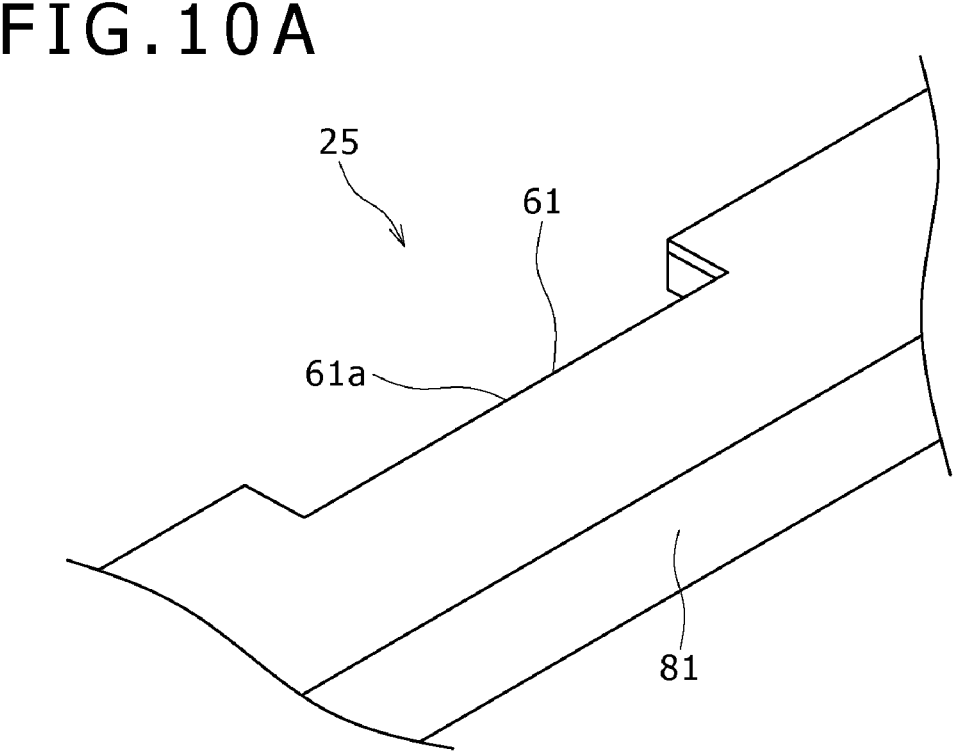
FIGS. 10A and 10B are a front-side perspective view and a back-side perspective view showing an incoming part of a light guide plate according to a fifth embodiment of the present invention.
Figure 10B:
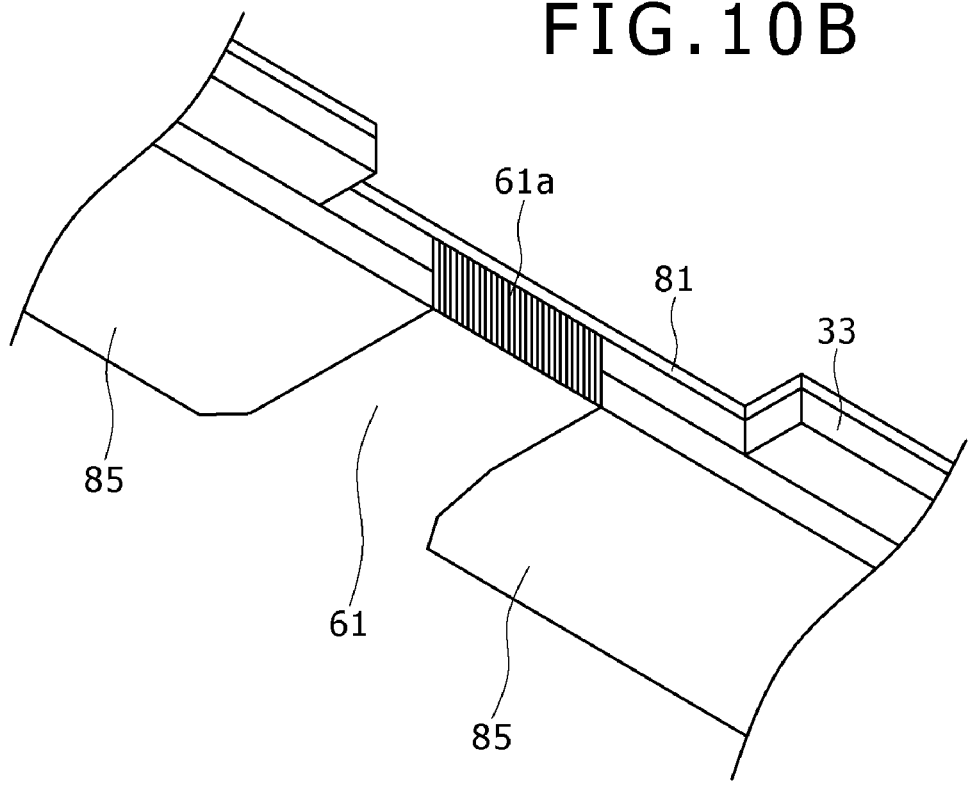

FIGS. 10A and 10B are a front-side perspective view (FIG. 10A) and a back-side perspective view (FIG. 10B) showing an incoming part 61 of a light guide plate 25 according to a fifth embodiment of the present invention.

As shown in FIGS. 10A and 10B, the light guide plate 25 in the fifth embodiment has a bent light guide part 33 and an incoming part 61 having shapes the same as or similar to those in the light guide plate 21 (see FIG. 3) in the first embodiment. At each of side end faces 61a of the incoming part 61, lenses being ridge-shaped in section are arrayed in the thickness direction. Such a lens array structure ensures that, in the light guide plate 25 in the fifth embodiment, the luminous intensity distribution of the light coming in through the incoming part 61 is broadened, and, particularly, irregularities of color in the case where high color reproduction LEDs are used as light sources 91 (see FIG. 1) can be reduced. Incidentally, the formation of the side end face 61a to have the lens array structure is not only applicable to the light guide plate 25 in the fifth embodiment but also similarly applicable in other embodiments.

In addition, the same front reflecting member 81 as that in the light guide plate 21 (see FIG. 3) in the first embodiment is arranged on the front side of the bent light guide part 33, and the same back reflecting member 85 as that in the light guide plate 22 (see FIG. 7) in the second embodiment is arranged on the back side of the bent light guide part 33. Therefore, the light leaking to the front side of the bent light guide part 33 is reflected by the front reflecting member 81, and the light leaking to the back side of the bent light guide part 33 is reflected by the back reflecting member 85.

Here, the luminous intensity distribution of the light entering the light guide plate 25 through the incoming part 61 is broadened in the horizontal direction by the side end faces 61a having the lens array structure. In this case, the bent light guide part 33 is present on both sides of each of the side end faces 61a, and, further, the back reflecting members 85 are arranged on both sides. Therefore, the light leaking through the lower half of the side end face 61a where the light does not enter the bent light guide part 33 is reflected by the back reflecting members 85 toward the incoming part 61. As a result, loss of light entering the incoming part 61 is minimized, and a very high light guide effect can be obtained.

FIG. 11 is a side view of a back irradiation type liquid crystal display device 3 using a light guide plate 26 according to a sixth embodiment of the present invention.

As shown in FIG. 11, the liquid crystal display device 3 includes an LCD 11, a polarizing plate 13, a polarizing plate 14, light sources 91, and a back reflecting plate 94 which are the same as or similar to those in the back irradiation type liquid crystal display device 1 shown in FIG. 1. On the other hand, a lens sheet 17 used here is different from the lens sheet 16 (see FIG. 1).

This lens sheet 17 has a shape as if the lens sheet 16 (see FIG. 1) has been reversed upside down. The lens sheet 17 is a prism sheet in which prisms are formed from a photo-curing resin (photopolymer) on the lower side of a highly transparent polyester film. With the lens sheet 17 arranged with its lenses (prisms) on the side of a principal surface 32a, the need for a diffuser 18 (see FIG. 1) is eliminated. Therefore, a further reduction in size (reduction in thickness) can be achieved.

In addition, the light guide plate 26 in the sixth embodiment includes an incoming part 31, side end faces 31a, a main body part 32, the principal surface 32a, a bent light guide part 33, an inclined front surface 33a, an inclined back surface 33b, and a flat light guide part 35 of which the shapes are the same as or similar to those in the light guide plate 21 (see FIG. 1) in the first embodiment. On the other hand, a front reflecting member 84 here is different from the front reflecting member 81 (see FIG. 1).

The front reflecting member 84 has a shape obtained by extending the front reflecting member 81 (see FIG. 1) in the direction of the main body part 32. To be more specific, in the liquid crystal display device 3 shown in FIG. 11, the diffuser 18 (see FIG. 1) is absent, so that the gap between the light guide plate 26 and the lens sheet 17 can be enlarged. In view of this, the front reflecting member 84 is so extended as to cover an end portion (at a position for overlapping with the lens sheet 17 as viewed in the perpendicular direction) of the principal surface 32a in addition to the inclined front surface 84 of the incoming part 31, whereby it is ensured that the light let go out through the principal surface 32a enters the lens sheet 17 reliably.

Figure 12:
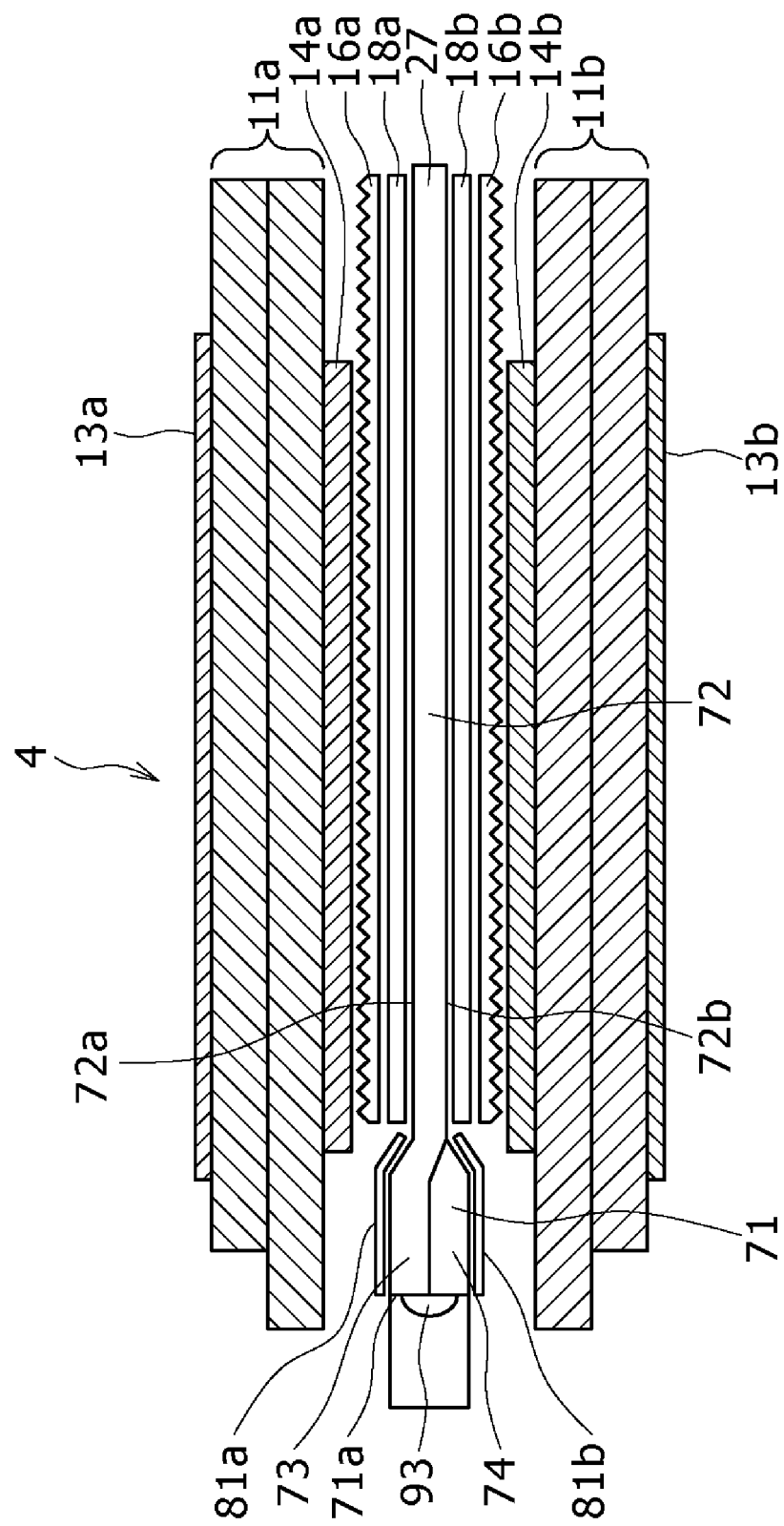
FIG. 12 is a side view of a back irradiation type liquid crystal display device using a light guide plate according to a seventh embodiment of the present invention.
Figure 15A:
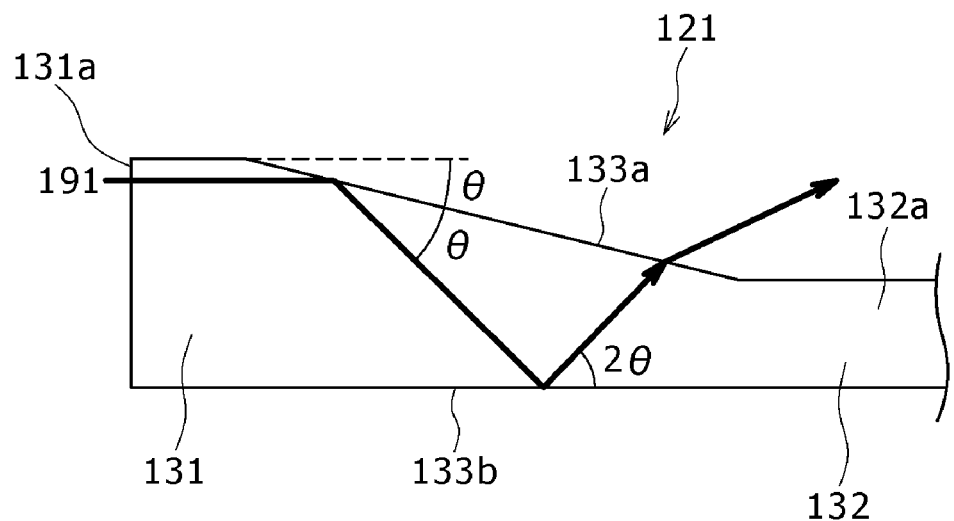
FIGS. 15A and 15B illustrate the conditions of generation of light leakage due to a light guide plate according to the related art.
Figure 15B:
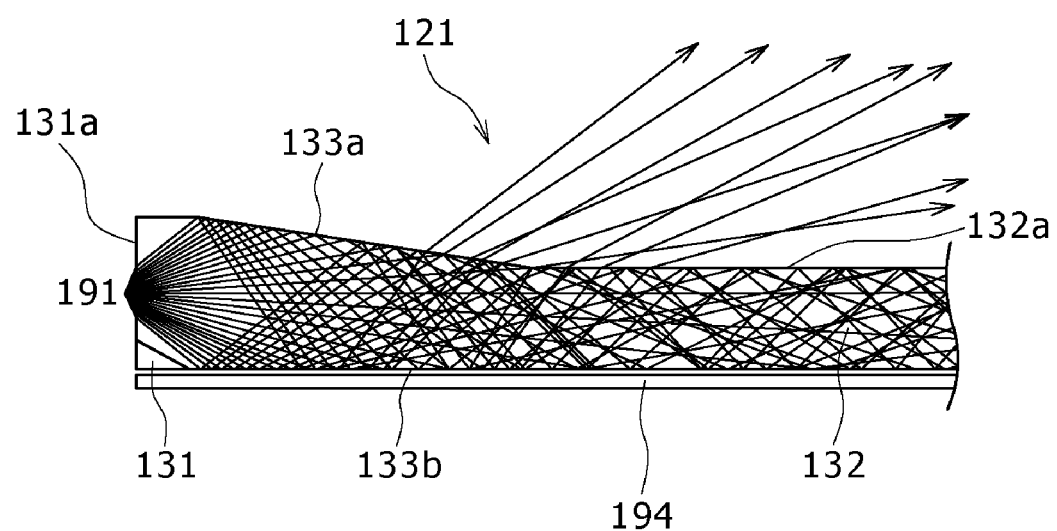

FIG. 12 is a side view of a back irradiation type liquid crystal display device 4 using a light guide plate 27 according to a seventh embodiment of the present invention.

As shown in FIG. 12, the liquid crystal display device 4 is obtained by adapting the back irradiation type liquid crystal display device 1 shown in FIG. 1 for both-side display. Specifically, LCDs 11a, 11b, polarizing plates 13a, 13b, polarizing plates 14a, 14b, lens sheets 16a, 16b, diffusers 18a, 18b which are the same as or similar to those in the liquid crystal display device 1 are arranged on both the upper and lower sides of a main body part 72 of the light guide plate 27.

Here, the light guide plate 27 in the seventh embodiment has a principal surface 72a and a principal surface 72b, for emitting light from both surfaces of the main body part 72. In addition, since the main body part 72 is located at the center of side end faces 71a of an incoming part 71, a bent light guide part 73 is provided so that the side end faces 71a are continuous with the principal surface 72a, and a bent light guide part 74 is provided so that the side end faces 71a are continuous with the principal surface 72b. Besides, due to the presence of the bent light guide part 73 and the bent light guide part 74, the thickness at the side end faces 71a of the light guide plate 27 is greater than the thickness at the side end faces 31a of the light guide plate 21 in the first embodiment shown in FIG. 1. Therefore, further larger light sources 93 can be arranged, and sufficient amounts of light for functioning as back lights for the LCDs 11a, 11b can be secured.

In addition, front reflecting members 81a, 81b the same as or similar to the front reflecting member 81 in the light guide plate 21 in the first embodiment shown in FIG. 1 are arranged at the bent light guide parts 73, 74. Therefore, the light leaking from the bent light guide part 73 is reflected by the front reflecting member 81a toward the bent light guide part 73 or the main body part 72, and the light leaking from the bent light guide part 74 is reflected by the front reflecting member 81b toward the bent light guide part 74 or the main body part 72.

Therefore, according to the liquid crystal display device 4 shown in FIG. 12, by the bent light guide parts 73, 74 of the light guide plate 27 and the front reflecting members 81a, 81b, the light of the light sources 93 coming in through the side end faces 71a is efficiently guided into the main body part 72, and is let go out through the principal surfaces 72a, 72b. Accordingly, the light emitted from the principal surfaces 72a, 72b advances in the directions perpendicular to the side end faces 71a (upwards and downwards in FIG. 12), and is emitted to illuminate the LCDs 11a, 11b through the diffusers 18a, 18b and the lens sheets 16a, 16b. This provides back lights for the LCDs 11a, 11b, whereby the contents being displayed on the LCDs 11a, 11b are made to be clearly visible.

FIG. 13 is a side view of a back irradiation type liquid crystal display device 5 using a light guide plate 28 according to an eighth embodiment of the present invention.

As shown in FIG. 13, the liquid crystal display device 5 is obtained through adaptation for both-side display, like the back irradiation type liquid crystal display device shown in FIG. 12. Specifically, LCDs 11a, 11b, polarizing plates 13a, 13b, polarizing plates 14a, 14b, and light sources 93 which are the same as those in the liquid crystal display device 4 are arranged on both the upper and lower sides of a main body part 72 of the light guide plate 27. On the other hand, lens sheets 17a, 17b provided here are different from the lens sheets 16a, 16b (see FIG. 12).

The lens sheets 17a, 17b are prism sheets the same as the lens sheet 17 shown in FIG. 11, and are arranged with the lenses (prisms) on the side of principal surfaces 72a, 72b, whereby the need for the diffusers 18a, 18b (see FIG. 12) is eliminated. Therefore, a further reduction in size (reduction in thickness) can be achieved.

In addition, the light guide plate 28 in the eighth embodiment includes an incoming part 71, side end faces 71a, a main body part 72, the principal surfaces 72a, 72b, and bent light guide parts 73, 74 which have the same shapes as those in the light guide plate 27 (see FIG. 12) in the seventh embodiment. On the other hand, front reflecting members 84a, 84b provided here are different from the front reflecting members 81a, 81b (see FIG. 12).

The front reflecting members 84a, 84b are obtained by extending the front reflecting members 81a, 81b (see FIG. 12) in the direction of the main body part 72. Specifically, in the liquid crystal display device 5 shown in FIG. 13, the diffusers 18a, 18b (see FIG. 12) are absent, so that the gaps between the light guide plate 28 and the lens sheets 17a, 17b can be enlarged. In view of this, the front reflecting members 84a, 84b are extended so as to cover end portions (at positions for overlapping with the lens sheets 17a, 17b as viewed in the perpendicular direction) of the principal surfaces 72a, 72b from the incoming part 71, whereby it is ensured that the light emitted from the principal surfaces 72a, 72b enters the lens sheets 17a, 17b reliably.

While some embodiments of the present invention have been described above, the invention is not limited to these embodiments, and various modifications are possible. For example, combinations of layouts of the bent light guide parts 33, the flat light guide parts 35 and the lateral light guide parts 36 of the light guide plate 21 in the first embodiment and the like factors can be modified, as occasion demands. In addition, application of the light guide plate 21 is not limited to the application as the back light in the liquid crystal display device 1; the light guide plate is widely applicable as a surface light source in a variety of displays.

The present application contains subject matter related to that disclosed in Japanese Priority Patent Application JP 2008-103688 filed in the Japan Patent Office on Apr. 11, 2008, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A light guide plate comprising:
a side end face for receiving light from a light source;
an incoming part which includes said side end face for guiding light input from said side end face;
a principal surface formed in a direction substantially perpendicular to said side end face for letting a portion of light guided by said incoming part go out; and
a main body part including said principal surface continuously coupled with said incoming part on the opposite side from said side end face,
wherein,
said incoming part is thicker on the side end face side than on said main body part, and has a bent light guide part for guiding a portion of the light coming in through said side end face outside the range of thickness of said main body part into the range of thickness of said main body part, said bent light guide part has an inclined front surface so that a surface in a direction substantially perpendicular to said side end face is continuous with said principal surface, and an inclined back surface inclined on the opposite side from said inclined front surface so as to be parallel to said inclined front surface, and
said main body part is formed to be wider than the width of said side end face, said incoming part has a flat light guide part for guiding a portion of light coming in through said side end face within the range of thickness of said main body part into the range of thickness of said main body part, said flat light guide part is disposed within the range for facing said light source, said bent light guide part is disposed to spread in the width direction of said main body part.

2. The light guide plate according to claim 1, wherein said incoming part has a lateral light guide part by which the light coming in through said side end face is guided into said bent light guide part while being changed in direction in the width direction of said main body part, said lateral light guide part is disposed in such a range as to face said light source.

3. The light guide plate according to claim 1, wherein a reflecting member is disposed on the flat light guide part side of said bent light guide part and in a range where said flat light guide part is absent.

4. The light guide plate according to claim 1, wherein said incoming part has a lateral light guide part by which the light coming in through said side end face is guided while being changed in direction in the width direction of said main body part, and said bent light guide parts are arranged in plurality along the thickness direction of said incoming part and said lateral light guide part ensures that said bent light guide parts are arranged in the state of spreading, so as not to overlap with each other, in the width direction of said main body part.

5. The light guide plate according to claim 1, wherein said incoming part is disposed in a corner portion of said main body part having a rectangular shape, in the state of being oriented diagonally.

6. The light guide plate according to claim 1, wherein said side end face is provided with lenses which are ridge-shaped in section and are arrayed in the thickness direction.

7. A display device comprising:
a light source;
a display in which the contents being displayed are made clearly visible by irradiation with light of said light source; and
a light guide plate by which the light coming in from said light source is guided and let go out toward said display
wherein,
said light guide plate includes a side end face for receiving light from said light source, an incoming part which includes said side end face for guiding light input from said side end face, a principal surface formed in a direction substantially perpendicular to said side end face for letting a portion of light guided by said incoming light go out, and a main body part including said principal surface continuously coupled with said incoming part on the opposite side from said side end face, said incoming part is thicker on the side end face side than on said main body part, and has a bent light guide part for guiding a portion of the light coming in through said side end face outside the range of thickness of said main body part into the range of thickness of said main body part, said bent light guide part has an inclined front surface so that a surface in a direction substantially perpendicular to said side end face is continuous with said principal surface, and an inclined back surface inclined on the opposite side from said inclined front surface so as to be parallel to said inclined front surface, and
said main body part is formed to be wider than the width of said side end face, said incoming part has a flat light guide part for guiding a portion of light coming in through said side end face within the range of thickness of said main body part into the range of thickness of said main body part, said flat light guide part is disposed within the range for facing said light source, said bent light guide part is disposed to spread in the width direction of said main body part.

8. The display device according to claim 7, wherein a lens member having lenses which are ridge-shaped in section and are arrayed in the width direction is provided; and said lens member is disposed between said display and said principal surface of said light guide plate, with said lenses on the principal surface side.

9. The display device according to claim 7, wherein said display is disposed on each of both sides of said main body part of said light guide plate.

10. An electronic apparatus with a display, comprising:
a light source;
a display in which the contents being displayed are made clearly visible by irradiation with light of said light source;
a light guide plate by which the light coming in from said light source is guided and let go out toward said display; and
an electronic controller operable to electronically control said light source and said display,
wherein,
said light guide plate includes a side end face for receiving light from said light source, an incoming part which includes said side end face for guiding light input from said side end face, a principal surface formed in a direction substantially perpendicular to said side end face for letting a portion of light guided by said incoming part go out, and a main body part including said principal surface continuously coupled with said incoming part on the opposite side from said side end face, said incoming part is thicker on the side end face side than on said main body part, and has a bent light guide part for guiding a portion of the light coming in through said side end face outside the range of thickness of said main body part into the range of thickness of said main body, said bent light guide part has an inclined front surface so that a surface in a direction substantially perpendicular to said side end face is continuous with said principal surface, and an inclined back surface inclined on the opposite side from said inclined front surface so as to be parallel to said inclined front surface, and
said main body part is formed to be wider than the width of said side end face, said incoming part has a flat light guide part for guiding a portion of light coming in through said side end face within the range of thickness of said main body part into the range of thickness of said main body part, said flat light guide part is disposed within the range for facing said light source, said bent light guide part is disposed to spread in the width direction of said main body part.

* * * * *